United States Patent
Rozenfeld et al.

(10) Patent No.: US 7,191,239 B2
(45) Date of Patent: Mar. 13, 2007

(54) METHOD AND SYSTEM TO CUSTOMIZE AND UPDATE A NETWORK CONNECTION APPLICATION FOR DISTRIBUTION TO MULTIPLE END-USERS

(75) Inventors: Alla Rozenfeld, San Carlos, CA (US); Singam Sunder, San Jose, CA (US); Tuan Bui, San Jose, CA (US)

(73) Assignee: iPass Inc., Redwood City, CA (US)

( * ) Notice: Subject to any disclaimer, the term of this patent is extended or adjusted under 35 U.S.C. 154(b) by 696 days.

(21) Appl. No.: 09/921,959

(22) Filed: Aug. 2, 2001

(65) Prior Publication Data

US 2002/0083429 A1    Jun. 27, 2002

Related U.S. Application Data

(60) Provisional application No. 60/223,454, filed on Aug. 2, 2000.

(51) Int. Cl.
G06F 15/16 (2006.01)
H04L 12/66 (2006.01)

(52) U.S. Cl. .................................... 709/229; 370/355.1

(58) Field of Classification Search ................ 709/217, 709/250, 227, 229
See application file for complete search history.

(56) References Cited

U.S. PATENT DOCUMENTS

| | | | |
|---|---|---|---|
| 4,811,249 A | 3/1989 | Marsh | |
| 5,202,921 A | 4/1993 | Herzberg et al. | |
| 5,331,574 A | 7/1994 | Temoshenko et al. | |
| 5,412,723 A | 5/1995 | Canetti et al. | |
| 5,446,680 A | 8/1995 | Sekiya et al. | |
| 5,497,421 A | 3/1996 | Kaufman et al. | |
| 5,564,017 A * | 10/1996 | Corn et al. ................. | 709/227 |
| 5,606,663 A | 2/1997 | Kadooka | |
| 5,611,048 A | 3/1997 | Jacobs et al. | |
| 5,638,514 A | 6/1997 | Yoshida et al. | |
| 5,726,883 A | 3/1998 | Levine | |
| 5,781,189 A | 7/1998 | Holleran | |
| 5,793,952 A | 8/1998 | Limsico | |
| 5,802,592 A | 9/1998 | Chess et al. | |
| 5,815,665 A | 9/1998 | Teper et al. | |
| 5,832,228 A | 11/1998 | Holden et al. | |
| 5,845,267 A | 12/1998 | Ronen | |
| 5,852,812 A * | 12/1998 | Reeder ........................ | 705/39 |
| 5,892,900 A | 4/1999 | Ginter et al. | |
| 5,991,292 A * | 11/1999 | Focsaneanu et al. ........ | 709/250 |

(Continued)

FOREIGN PATENT DOCUMENTS

EP    0905615 A2    3/1999

(Continued)

OTHER PUBLICATIONS

International Search Report-PCT/US01/4150, Aug. 2, 2001.

(Continued)

Primary Examiner—John Follansbee
Assistant Examiner—Ashok Patel
(74) Attorney, Agent, or Firm—Schwegman, Lundberg, Woessner & Kluth, P.A.

(57) ABSTRACT

A method to manage a customized network connection application includes generating plurality of input interfaces to receive customization information pertaining to the customized network connection application. The customization information pertaining to the customized network connection application is received via the plurality of input interfaces. The customization information is then stored as a profile associated with the customized network connection application. The customized network connection application is automatically generated utilizing the profile, and distributed to at least one recipient.

58 Claims, 19 Drawing Sheets

U.S. PATENT DOCUMENTS

| | | | |
|---|---|---|---|
| 6,023,470 A | 2/2000 | Lee et al. | |
| 6,023,502 A | 2/2000 | Bouanaka et al. | |
| 6,026,375 A | 2/2000 | Hall et al. | |
| 6,028,917 A | 2/2000 | Creamer et al. | |
| 6,029,143 A | 2/2000 | Mosher et al. | |
| 6,032,132 A | 2/2000 | Nelson | |
| 6,032,137 A | 2/2000 | Ballard | |
| 6,035,281 A | 3/2000 | Crosskey et al. | |
| 6,047,051 A | 4/2000 | Ginzboorg et al. | |
| 6,049,671 A | 4/2000 | Slivka et al. | |
| 6,055,503 A * | 4/2000 | Horstmann | 717/168 |
| 6,078,906 A | 6/2000 | Huberman | |
| 6,081,508 A | 6/2000 | West et al. | |
| 6,094,721 A | 7/2000 | Eldridge et al. | |
| 6,112,239 A | 8/2000 | Kenner | |
| 6,125,354 A * | 9/2000 | MacFarlane et al. | 705/40 |
| 6,128,601 A | 10/2000 | Van Horne et al. | |
| 6,157,618 A | 12/2000 | Boss et al. | |
| 6,167,126 A | 12/2000 | Janning | |
| 6,175,869 B1 | 1/2001 | Ahuja et al. | |
| 6,178,460 B1 | 1/2001 | Maddalozzo, Jr. et al. | |
| 6,188,994 B1 | 2/2001 | Egendorf | |
| 6,189,096 B1 | 2/2001 | Haverty | |
| 6,198,824 B1 | 3/2001 | Shambroom | |
| 6,208,977 B1 | 3/2001 | Hernandez et al. | |
| 6,212,280 B1 | 4/2001 | Howard, Jr. et al. | |
| 6,212,561 B1 * | 4/2001 | Sitaraman et al. | 709/217 |
| 6,216,117 B1 | 4/2001 | Hall | |
| 6,219,790 B1 | 4/2001 | Lloyd et al. | |
| 6,240,091 B1 * | 5/2001 | Ginzboorg et al. | 709/229 |
| 6,243,367 B1 | 6/2001 | Hussain | |
| 6,247,050 B1 | 6/2001 | Tso et al. | |
| 6,260,142 B1 | 7/2001 | Thakkar et al. | |
| 6,269,401 B1 | 7/2001 | Fletcher et al. | |
| 6,278,460 B1 | 8/2001 | Myers et al. | |
| 6,317,792 B1 * | 11/2001 | Mundy et al. | 709/227 |
| 6,324,579 B1 * | 11/2001 | Bleuse et al. | 709/227 |
| 6,327,707 B1 * | 12/2001 | McKeeth et al. | 709/228 |
| 6,330,443 B1 | 12/2001 | Kirby | |
| 6,339,790 B1 | 1/2002 | Inoue | |
| 6,405,028 B1 | 6/2002 | DePaola et al. | |
| 6,463,534 B1 | 10/2002 | Geiger et al. | |
| 6,505,246 B1 | 1/2003 | Land et al. | |
| 6,510,463 B1 | 1/2003 | Farhat et al. | |
| 6,513,060 B1 | 1/2003 | Nixon et al. | |
| 6,522,884 B2 | 2/2003 | Tennison et al. | |
| 6,546,492 B1 | 4/2003 | Walker et al. | |
| 6,549,770 B1 | 4/2003 | Marran | |
| 6,571,290 B2 | 5/2003 | Selgas et al. | |
| 6,577,858 B1 | 6/2003 | Gell | |
| 6,578,075 B1 * | 6/2003 | Nieminen et al. | 709/221 |
| 6,628,775 B1 | 9/2003 | Van Tol | |
| 6,640,242 B1 | 10/2003 | O'Neal et al. | |
| 6,687,560 B2 | 2/2004 | Kiser et al. | |
| 6,748,439 B1 * | 6/2004 | Monachello et al. | 709/227 |
| 6,753,887 B2 * | 6/2004 | Carolan et al. | 709/227 |
| 6,779,004 B1 | 8/2004 | Zintel | |
| 6,792,082 B1 | 9/2004 | Levine | |
| 6,792,464 B2 * | 9/2004 | Hendrick | 709/217 |
| 6,985,945 B2 | 1/2006 | Farhat et al. | |
| 2001/0056485 A1 | 12/2001 | Barrett et al. | |
| 2002/0029275 A1 | 3/2002 | Selgas et al. | |
| 2002/0114346 A1 | 8/2002 | Lampe et al. | |
| 2002/0124078 A1 | 9/2002 | Conrad | |
| 2002/0143494 A1 | 10/2002 | Conrad | |
| 2002/0169792 A1 | 11/2002 | Perinet et al. | |
| 2003/0120465 A1 | 6/2003 | Mets et al. | |
| 2003/0120627 A1 | 6/2003 | Emery et al. | |
| 2003/0120661 A1 | 6/2003 | Mets et al. | |
| 2004/0128379 A1 | 7/2004 | Mizell et al. | |
| 2005/0055371 A1 | 3/2005 | Sunder et al. | |
| 2005/0204036 A1 | 9/2005 | Farhat et al. | |

FOREIGN PATENT DOCUMENTS

| | | |
|---|---|---|
| GB | 2378021 | 1/2003 |
| JP | 02033648 | 2/1990 |
| JP | 02039260 | 2/1990 |
| JP | 02112053 | 4/1990 |
| JP | 03189852 | 8/1991 |
| JP | 04054661 | 2/1992 |
| JP | 04067252 | 3/1992 |
| JP | 04084254 | 3/1992 |
| JP | 04142655 | 5/1992 |
| JP | 05189288 | 7/1993 |
| JP | 05199327 | 8/1993 |
| JP | 07182064 | 7/1995 |
| JP | 09265455 | 10/1997 |
| JP | 09330298 | 12/1997 |
| JP | 10289209 | 10/1998 |
| JP | 11203247 | 7/1999 |
| JP | 00112892 | 4/2000 |
| JP | 00165839 | 6/2000 |
| JP | 00194657 | 7/2000 |
| JP | 00259276 | 9/2000 |
| JP | 01053910 | 2/2001 |
| WO | WO-97/15885 | 5/1997 |
| WO | WO-9966692 | 12/1999 |
| WO | WO-0002149 A1 | 1/2000 |
| WO | WO-0004434 A2 | 1/2000 |
| WO | WO-00019297 | 4/2000 |
| WO | WO-00062514 | 10/2000 |
| WO | WO-35256 A2 | 5/2001 |
| WO | WO-03/056403 A1 | 7/2003 |
| WO | WO-356403 | 7/2003 |
| WO | WO-04072825 A3 | 8/2004 |
| WO | WO-79544 | 9/2004 |

OTHER PUBLICATIONS

"About Fiberlink", Published by Fiberlink Communications Corp. (2001), 1 pg.

"International Search Report for PCT Application No. PCT/US01/05752", (May 9, 2001).

"International Search Report for PCT Application No. PCT/US01/05724", (Jun. 8, 2001).

Barron, G., "Written Opinion for PCT Application No. PCT/US02/12343", Found in 2062.010WO1(Mar. 6, 2003).

Edwards, Morris, "It's a VPN thing—Technology Information", *Communications News*, (Aug. 1, 1999), p. 94.

Newton, Harry, "Newton's Telecom Dictionary, 18th Edition", *New York: CMP Books*, (Feb. 2002), p. 659.

No Author, "Broadmedia Introduces G-Phone DLX Phone (Product Announcement)", *Tele-Service News*, 12(6), (Jun. 1, 2000), 2 pgs.

No Author, "Dial Up With Bay's New Remote Access Concentrator", *It Times*, (Oct. 21, 1997) p. 6.

No author listed, "EarthLink Dials Up ClientLogic for Multi-Channel Technical Support" *Business Wire* (Jul. 24, 2001) 2 pgs.

No author listed, "IP Axess Adds Fixed-Wireless Service Provider to Participants in Its Expanding Evaluation Program" *Business Wire* (Apr. 4, 2001) 2 pgs.

No author listed, "Lucent Technologies Launches Next-Generation Voice Dialing Service for Wireless Networks (Brief Article)" *Cambridge Telcom Report*, (Mar. 27, 2000), 2 pgs.

No author listed, "Netopia Introduces First ADSL Routers to Offer Integrated Backup Module for "Fast Track" Deployment and Fully Redundant Internet Connectivity" *Business Wire*, (May 24, 2000), 5 pgs.

No Author, "Trinagy's New Insight for Dial Access Solution Suite Delivers Proactive Management of Dial-Up Service Offerings" *Business Wire*, (Apr. 24, 2001), 2 pgs.

No Author, "Ubrandit.com Adds Gigitel and Zodiac Cafe to Virtual ISP Client List" *Business Wire*, (Oct. 16, 2000), 2 pgs.

Schneier, Bruce, "In: Applied Cryptography: protocols, algorithms, and source code in C", *New York: Wiley, 2nd Edition*, (1996), pp. 31-34, 52-56, 60, 75-79, 256, 480-481.

West, Wray, "Don't be nervous—remote access VPN's—Industry Trend or Event", *Communications News*, 37(5), (May 2000) pp. 28, 30, 32.

Kang, Paul H., "PCT Search Report", Sep. 17, 2003.

Aboba, B., et al., "The Network Access Identifier", *RFC2486*, (Jan. 1999), 1-5.

Barron, Gilberto, "International Search Report", *PCT/US02/25996*, Dec. 12, 2002.

Barron, Gilberto, "Written Opinion", *PCT/US02/12343*, Jul. 8, 2003.

Blache, Fabian III, "Spicing up the Web", *Greater Baton Rouge Business Report*, ISSN-0747-4652, (Jul. 18, 2000),v18n23 pp. 94.

Blass, Steve, "Dr. Internet", *Network World*, ISSN-0887-7661,(Mar. 11, 2002),55.

Brockmann, Peter, "Rapport dialup switch redefines internet service opportunities", *Telesis*, ISSN-0040-2710,(96/12/00),n102 pp. 12-13.

Bruno, Lee, "Software & security. (Netegrity's Siteminder Enterprise Security software) (Product Information)", *Data Communications*, ISSN-0363-6399, (Jan. 1997),84(3), page(d).

Callahan, Paul, "International Search Report", *PCT/US02/12343*.

Clyde, Robert A., "Try a step-by-step approach, (data security measures)", *Computing Canada*, ISNN-0319-0161,(Jan. 4, 1995),42(1) page(s).

Edwards, Morris, "It's a VPN thing. (Technology Information)", *Communications News*, ISSN-0010-3532.(Aug. 1, 1999),vol. 36, No. 8, pp. 94.

Greene, Tim, "Upstart VPN services staking out new ground", *Network World*, ISSN-0887-7661,(Apr. 16, 2001),v18n16 pp. 30.

Guy, Sandra, "Untangling phone frustration, Bellcore solution offers a simpler way to do business", *Telephony*, ISSN-0040-2656,(Jun. 2, 1997).

Johnson, Johna T., "Linking corporate users to the Internet", *Data Communications*, ISSN-0363-6399,(93/01/00),v22n1 pp. 56-58.

Likier, Marty, "Using Dial-Up Technology for Internetworking Applications", *Telecommunications*, ISSN-0278-4831,(92/05/00),v26n5 pp. 52,54.

Malinowski, Walter, "International Search Report", *PCT/US01/05752*.

Millin, Vincent, "International Search Report", *PCT/US01/05724*.

No-Author, "Broadmedia Introduces G-Phone DLX IP Phone. (Product Announcement)", *Tele-Service News*, (Jun. 1, 2000),vol. 12, No. 6, PP. NA No-Author, "Companies mix and match VPN, dial-access support", *InternetWeek*, ISSN-0746-8121,(Jan. 25, 1999),n749 pVPN20.

No-Author, "Dial Up with Bay's new Remote Access Concentrator", *IT Times*, (Oct. 21, 1997),p. 6.

No-Author, "EarthLink Dials Up ClientLogic for Multi-Channel Technical Support", *Business Wire*, (Jul. 24, 2001),2226.

No-Author, "IP Axess Adds Fixed-Wireless Service Provider to Participants in Its Expanding Evaluation Program", *Business Wire*, (Apr. 4, 2001),2225.

No-Author, "Lucent Technologies Launches Next-Generation Voice Dialing Service for Wireless Networks.(Brief Article)", *Cambridge Telecom Report*, (Mar. 27, 2000),NA.

No-Author, "Netopia Introduces First ADSL Routers to Offer Integrated Backup Module for "Fast Track" Deployment and Fully Redundant Internet Connectivity", *Business Wire*, (May 24, 2000),0514.

No-Author, "Trinagy's New Insight for Dial Access Solution Suite Delivers Proactive Management of Dial-Up Service Offerings", *Business Wire*, (Apr. 24, 2001),2448.

No-Author, "Ubrandit.com Adds Gigitel and Zodiac Cafe to Virtual ISP Client List", *Business Wire*, (Oct. 16, 2000),0709.

Peeso, Thomas R., "International Search Report", *PCT/US02/12475*, Jan. 16, 2003.

Salamone, Salvatore, "Simplified Roaming, From Pop to Pop", *InternetWeek*, ISSN-1096-9969,(Feb. 15, 1999),n752 pp. 11.

Sanders, Bob, "Despite nasty shake-out lical ISPs are thriving", *New Hampshire Business Review*, ISSN-0164-8152,(Feb. 23, 2001),v23n4 pp. 1.

Scarcia, Costantino, "Getting On the New With The Right ISP", *New Jersey Business*, ISSN-0028-5560,(Sep. 1, 2000),v46n9 pp. 40.

Schneier, B., "Applied Cryptography Second Edition", *John Wiley and Sons*, (Oct. 1995),31-34, 52-56, 60, 75-79, 256, 480-481.

Semich, J. W., "56K server supports U.S. Robotics and Lucent—Modems built into Model 8000 from Bay Networks", *ISSN-1081-3071*, ISSN-1081-3071,(Aug. 18, 1997),v3 n26 p. 25.

Shen, Jin, et al., "Research and implementation of proxy server", *Journal of Nanjing University of Aeronautics & Astronautics*, ISSN-1005-2615,(Dec. 2000),vol. 32 No. 6 pp. 620-624.

Silberg, Lurie, "Dialing the Web AT&Ts Internet Cellphone Debuts at Mass; Launches PocketNet wireless data service at retail in an attempt to bring cellphone with Internet access to the masses", *HFN the Weekly Newspaper for the Home Furnishing Network*, (Oct. 13, 1997),93.

Smithers, Matthew, "International Search Report", *PCT/US02/12470*, Sep. 16, 2002.

Trammell, James, "International Search Report", *PCT/US01/05723*, May 23, 2001.

West, W., "Don't be nervous Y remote access VPNs", *Communications News*, ISSN-0010-3632,(May 2000),vol. 37, No. 5 pp. 28, 30, 32.

Derfler, Jr., F. J., et al., "How Network Works", *Que Corporation, Milleneum Edition*, (2000),8 pgs.

Helmig, J., "Dialup Networking with TCP/IP", http://www.windowsnetworking.com, (Observied 8.4.05), 1-19.

Landry, S., "Roaming User Profiles", http://www.engr.sc.edu/its/handouts/nt_basics/profiles.htm, (Feb. 18, 1999),3 pgs.

Schneier, B., *Applied cryptography: protocols, algorithms, and source code in C*, New York: Wiley, 2nd ed., (1996),37-38.

Schneier, B., "Applied Cryptography", *Protocols, Algorithms, and Source Code in C*, Second Edition, John Wiley and Sons, (1996), 185-187.

Wang, Wei-Lung, et al., "A protocol for billing mobile network access devices operation in foreign networks", *Seventh IEEE International Workshops on Enabling Technologies: Infrastructure for Collaborative Enterprises, 1998. (WET ICE '98) Proceedings*, (Jun. 17-19, 1998),262-268.

\* cited by examiner

| Partner Code | This section will be automatically populated |

301

| Customer Account | Select from existing accounts ▼ |

FIG. 4

| Partner Code | This section will be automatically populated |
| Customer Account | This section will be automatically populated |

| |

| ○ Create a new profile | |
| ○ Edit an existing profile | Select from existing Profiles ▼ |

302

Click the Submit button to proceed. | Submit |

| Pre-fill domain name to: | | (eg.g, username@domainname) |
| Allow users to change domain name | ○ Yes ● No | |
| Include realm prefix | | (eg.g, prefixusername@domainname) |

| IP Address of Backup DNS Server | | (e.g., ###.###.###.###) |

| Allow users to save passwords | ○ Yes ● No |

| Display prices for all POPs: | ○ Yes ● No |
| Display as: | ● [$ ▼]   ○ [         ] |
| Conversion Rate: | 1 US$ - [       ] (your currency) |

| Update phonebook: | ● Automatically   ○ Manualy |
| Allow users to change update mode: | ● Yes   ○ No |

| Maximum session connect time (in minutes) for users is: | ● Unlimited   ○ Limited to [   ] minutes |

| Set shortcut name to: | iPassConnect+ [         ] |

FIG. 6

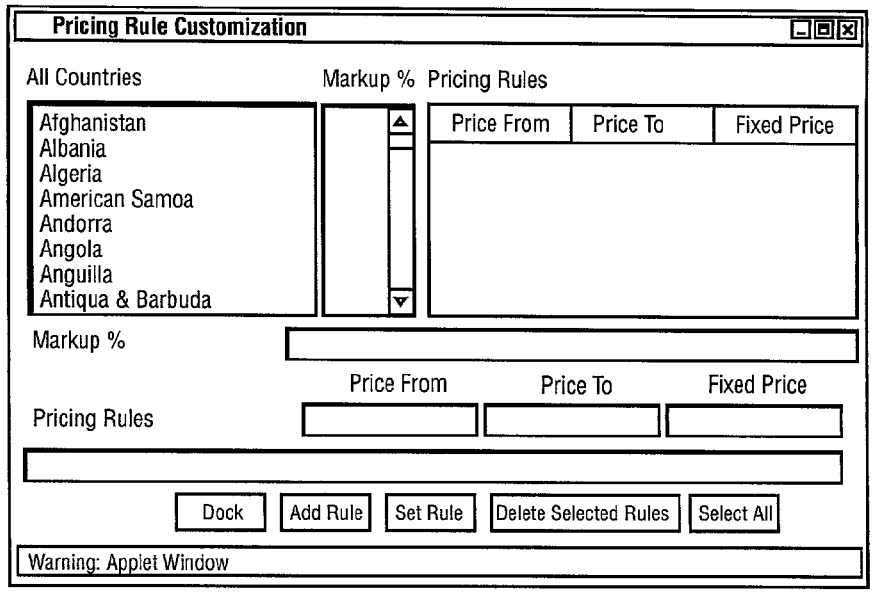

| | |
|---|---|
| Default Authentication Domain | |
| Backup DNS IP Address | 254.254.254.254 |
| Save Password | No |
| POP Pricing Display | Shown, Currency: $ |
| Phonebook Updates | Default: automatic, User can change: yes |
| Session Limit | Unlimited |
| Dialer Shortcut Name | iPassConnect COMPANY |
| Custom Logo | Default Logo |
| Connect Actions | PreConnect (2),PreDial (1),PreTunnel (1),OnCancel (1),OnError (1), |
| Custom POPs added | Yes |
| iPass POPs Phonebook | ISP plan with no prices |

Click the Edit button to make changes. [Edit]
Click the Build Dialer button to proceed. [Build Dialer]

| Executable Installer file: | Download... |
| HTML PhoneBook File: | Download... |
| Zip File Phonebook | Download... |
| CSV Phonebook | Download... |
| ASCII Phonebook | Download... |
| Macintosh Phonebook | Download... |

MODEM DIALUP:
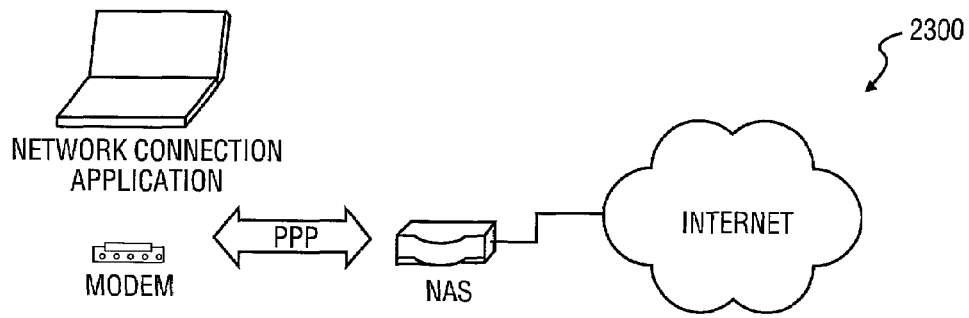
WIRELESS BROADBAND:
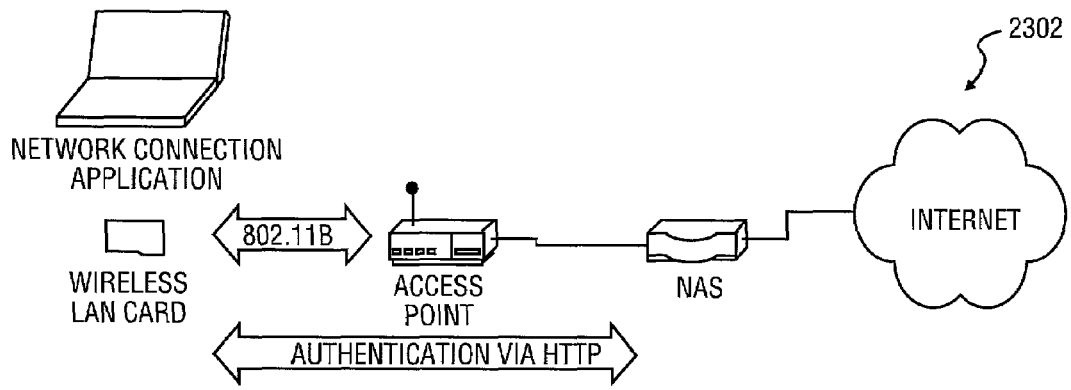
WIRED BROADBAND:
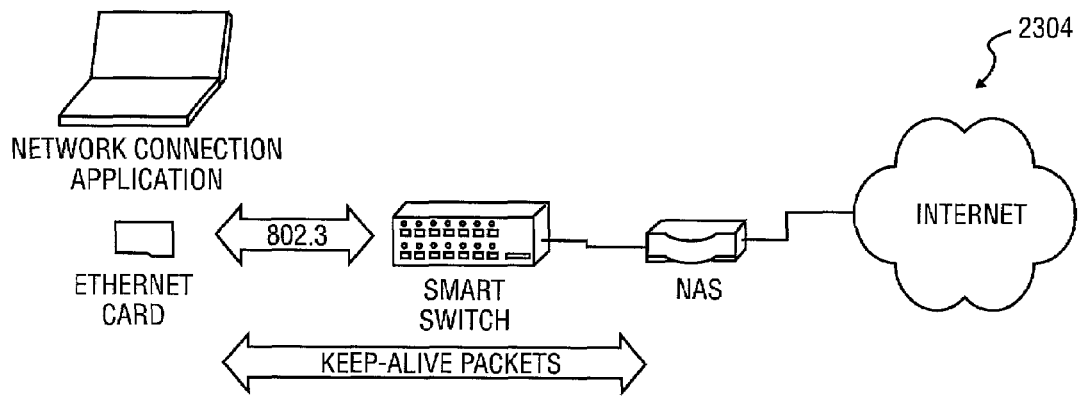
FIG. 23

METHOD AND SYSTEM TO CUSTOMIZE AND UPDATE A NETWORK CONNECTION APPLICATION FOR DISTRIBUTION TO MULTIPLE END-USERS

CROSS REFERENCE TO RELATED APPLICATIONS

This application claims the benefit of U.S. Provisional Application No. 60/223,454, filed Aug. 2, 2000.

FIELD OF THE INVENTION

The present invention relates to the field of remote network connections and more particularly to centralized customization of network dialer application profile.

BACKGROUND OF THE INVENTION

With the technological developments of the last decade and growing popularity of online commerce, e-mail, online chatting and the Internet in general, the demand to have constant access to these innovative technological ways of communication is rapidly increasing. Some users cannot imagine their lives without the Internet and email; some cannot imagine their lives without being able to buy groceries online. Constant desire to be connected to the informational highway increases demand for reliable, fast, convenient network connection.

Anyone using current technology has dealt with networks at some point. Being connected to a local network where users share files and data on one server is a common scheme in workplaces. Companies would like their employees to use network connection tools that reflect company's policies, such as session duration limits, usage of particular Point-to-Point locations, etc. However, companies usually obtain network access tools from outside providers. These network access tools are not customized to company's preferences and thus significantly reduce companies' flexibility in selecting own network connection properties.

SUMMARY OF THE INVENTION

According to one aspect of the invention, there is provided a method to manage a customized network connection application. A plurality of input interfaces are generated to receive customization information pertaining to the customized network connection application. The customization information pertaining to the customized network connection application is received via the plurality of input interfaces. The customization information is stored as a profile associated with the customized network connection application. The customized network connection application is automatically generated utilizing the profile, and distributed to at least one recipient.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 4 is a graphical end-user interface presented to a customer to allow the selection of a customer account according to one embodiment of the present invention;

FIG. 5 is a graphical end-user interface presented to the customer to create or edit a dialer profile according to one embodiment of the present invention;

FIG. 6 is a graphical end-user interface presented to the customer to allow an input of basic settings according to one embodiment of the present invention;

FIG. 12 is a graphical user-interface presented to the customer to allow specification of pricing rules according to one embodiment of the present invention;

FIG. 13 is graphical user-interface presented to the customer to allow review of customized information according to one embodiment of the present invention;

FIG. 14 is a graphical user-interface presented to the customer to allow downloading of files according to one embodiment of the present invention;

FIG. 23 is a diagrammatic representation of a number of exemplary protocols and/or components that may be utilized to support various access methods that may be performed utilizing a network connection application, according to exemplary embodiments of the present invention.

DETAILED DESCRIPTION

Figure 1A:
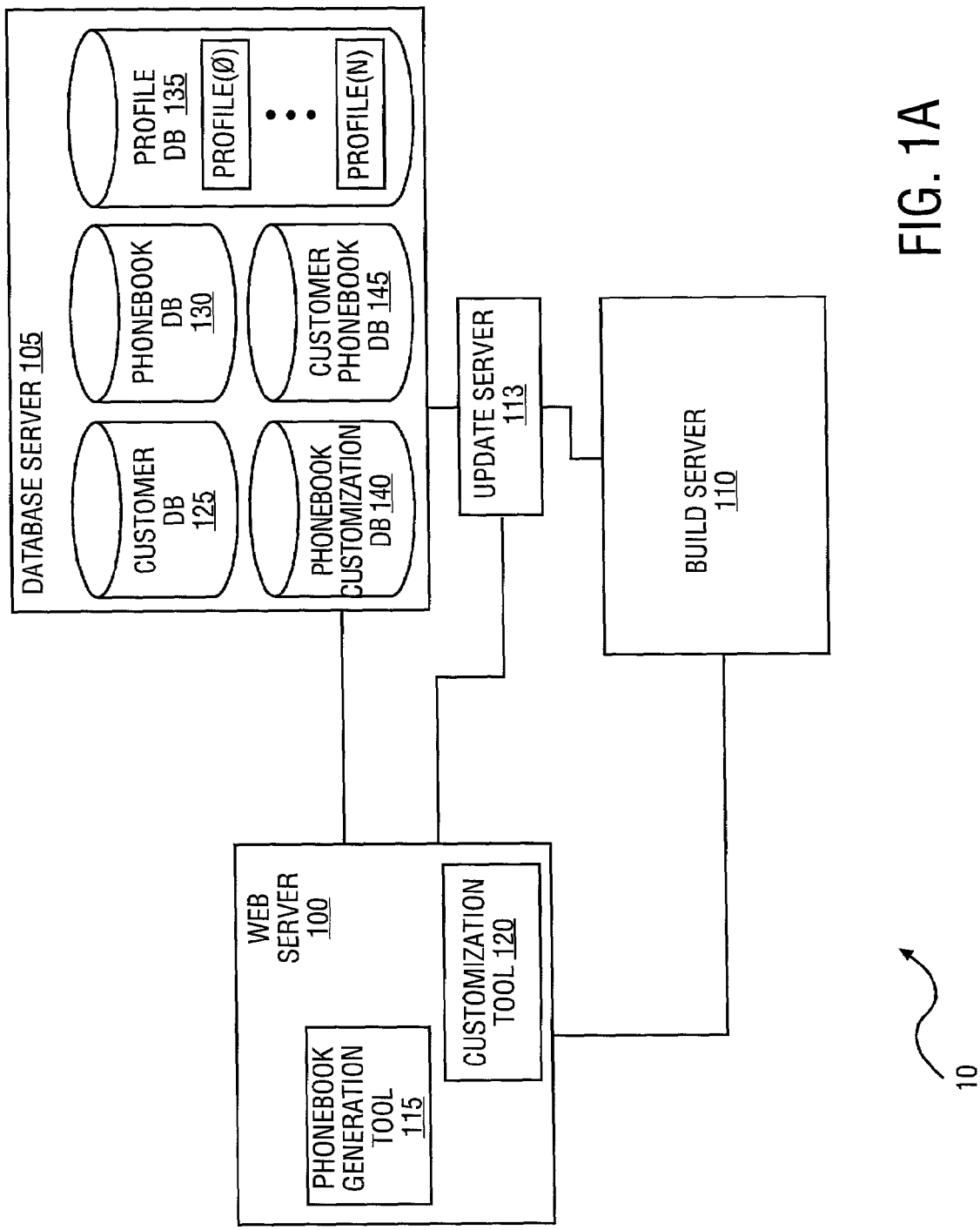
FIG. 1A is a diagram of a centralized customization system architecture according to one embodiment of the present invention.

Although the present invention is described below by way of various embodiments that include specific structures and methods, embodiments that include alternative structures and methods may be employed without departing from the principles of the invention described herein.

In general, embodiments described below feature a system and a method that facilitate centralized customization of a network connection application (e.g., a dialer) to serve the needs of a given customer. A preferred embodiment of the present invention features a centralized network dialer customization system.

Network-related Technology

Before describing embodiments of the present invention in detail, it may be helpful to discuss some of the concepts on which the present invention is based. A component of one embodiment of the present invention is a computer server. Servers are computer programs that provide some service to other programs, called clients. A client and server communicate by means of message passing often over a network, and use some protocol, (i.e., a set of formal rules describing how to transmit data), to encode the client's requests and/or responses and the server's responses and/or requests. The server may run continually waiting for client's requests and/or responses to arrive or it may be invoked by some higher level continually running server that controls a number of specific servers. Client-server communication is analogous to a customer (client) sending an order (request) on an order form to a supplier (server) dispatching the goods and an invoice (response). The order form and invoice are part of the protocol used to communicate in this case.

Another component of one embodiment of the present invention is Microsoft Foundation Class (MFC), a collection of software structures written in C++ language and which are Microsoft Windows-based classes and which can respond to messages, make windows, and from which application specific classes can be derived. The current invention also utilizes the Remote Access Service (RAS) API, which provides an abstraction layer between the application and the underlying hardware that provides the Point-To-Point Protocol (PPP) connection. RAS is a feature built into Windows NT that enables users to log into an NT-based Local Area Network (LAN) using a modem, X.25 connection or Wide Area Network (WAN) link. RAS works with several major network protocols, including TCP/IP, IPX, and Netbeui.

Another component of one embodiment of the present invention is a Point-to-Point Tunnel Protocol (PPTP), a new technology for creating Virtual Private Networks (VPN), developed jointly by Microsoft Corporation, U.S. Robotics and several remote access vendor companies, know collectively as the PPTP forum. A VPN is a private network of computers that uses the public Internet to network processing locations. Because the Internet is essentially an open network, PPTP is used to ensure that messages transmitted from one VPN node to another are secure.

Yet, another component of one embodiment of the present invention is a Telephony Application Programming Interface (TAPI), an Application Programming Interface (API) for connecting personal computers running Windows operating system to telephone services. TAPI was introduced in 1993 as the result of joint development by Microsoft Corporation and Intel Corporation. The standard supports connections by individual computers as well as Local Area Networks (LAN) connections serving many computers. Within each connection type, TAPI defines standards for simple call control and for manipulating call content.

Another component of one embodiment the present invention is an Internet Service Provider (ISP). An ISP is a service that provides access to the Internet. For a monthly fee, a service provider gives a customer a software package, username, password and Internet access phone number. Equipped with a modem (e.g., a dial-up, DSL, ISDN or wireless), a customer can then log onto the Internet and browse the World Wide Web (WWW) and USENET, send and receive e-mail, and access a particular network. In addition to serving individuals, ISPs also serve large companies, providing a direct connection from the company's networks to the Internet. ISPs themselves are connected to one another through Network Access Points (NAPs). NAP is a public network exchange facility where ISPs can connect with one another in peering arrangements. The NAPs are a key component of the Internet backbone because the connections within them determine how traffic is routed. They are also the points of most Internet congestion.

ISPs generally provide a plurality of Point of Presence gateways (POP) in order for a customer to gain an Internet access by making a local call. A POP (point-of-presence) is an access point to the Internet that is associated with a phone number. A connection established via such a POP causes a unique IP address to be assigned to a machine that accesses the Internet utilizing the established connection. The number of POPs that an ISP has and the number of subscribers are usually used as a measure of its size or growth rate.

Yet another component in one embodiment of the present invention is a servlet. Servlets are Java applications, which run on a Web server or application server and provide server-side processing, typically to access a database. It is a Java-based alternative to Common Gateway Interface (CGI) scripts, interface programs, usually written in C or PERL, that enables an Internet server to run external programs to perform a specific function. The most important difference between servlets and CGI scripts is that a Java servlet is persistent. This means that once it is started, it stays in memory and can fulfill multiple requests. In contrast, a CGI script disappears once it has fulfilled a request.

Architecture

With these concepts in mind, an embodiment of a system architecture of the present invention can be explored. In one embodiment, the present invention includes customization system 10 and an end-user tool that allows a user to establish a network connection. FIG. 1A illustrates an exemplary customization system 10 that includes a web server 100, database server 105, a build server 110, and an update server 113. The web server 100 contains a phonebook generation tool 115, responsible for phonebook generation update and customization, and a customization tool 120, responsible for customization of a dialer application (hereinafter "the dialer"). While the exemplary embodiment of the present invention describes the generation, distribution and updating of a customized dialer, it will be appreciated that the dialer is merely an example of a connection application with purposes of establishing a connection between a client and a server computer, or between peer computers within a network. Accordingly, the present invention should not be construed as being limited to the generation, distribution and updating of an application for establishing a dialed connection over the Public Switched Telephone Network (PSTN), and extends to the generation, distribution and updating of any customized connection application that operates to establish a connection between machines coupled via a network.

The database server 105 contains a customer database 125, a phonebook database 130, a profile database 135, a phonebook customization database 140, and customer phonebook database 145. It will be appreciated that databases may not be stored at the server machine and the database data may be uploaded to the server machine when necessary.

Figure 1B:
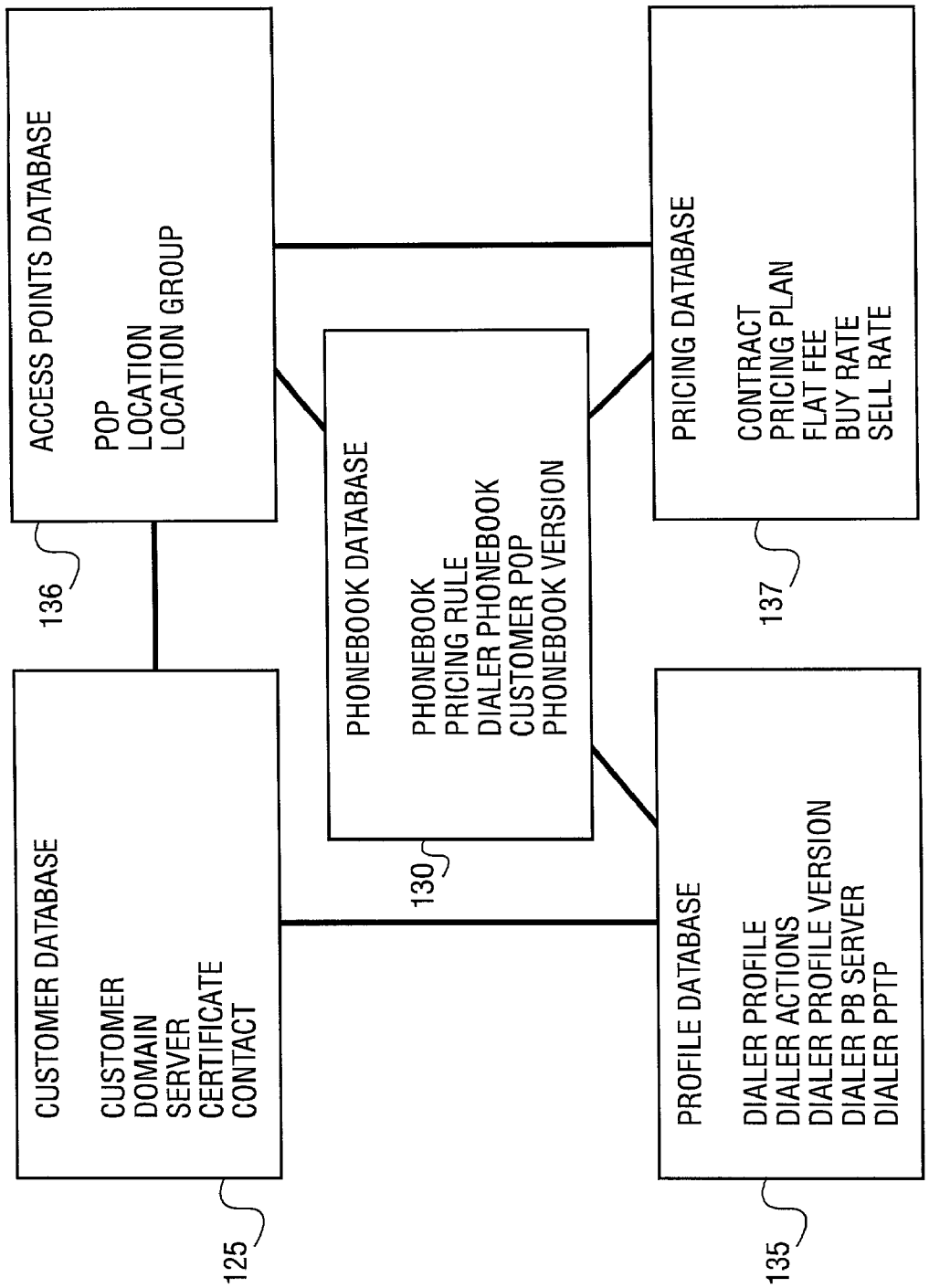
FIG. 1B is a block diagram illustrating domains of a data model utilized by a customization tool and a phonebook generation tool of the customization system, according to one embodiment of the present invention.

FIG. 1B is a diagrammatic representation of domains of a data model accessed and maintained by the phonebook generation tool 115 and the customization tool 120, according to an exemplary embodiment of the present invention. Specifically, the data model is shown to include the primary components of the customer database 125, the phonebook database 130, and the profile database 135. The data model is also shown to include an access points database 136, and a pricing database 137, which will be described in further detail below.

Methodology

Figure 2:
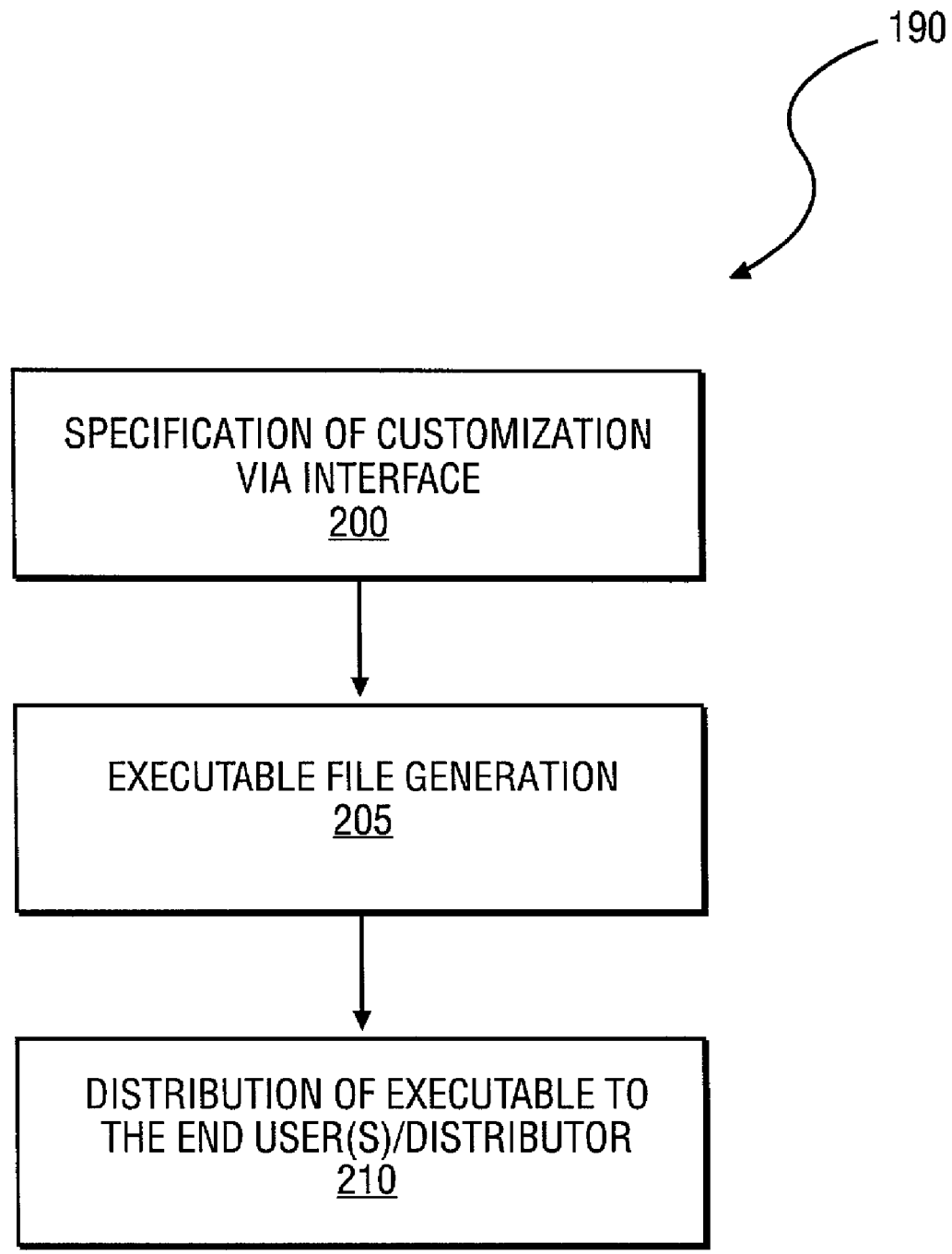
FIG. 2 is a flow diagram illustrating operation of a back-end of a centralized customization system according to one embodiment of the present invention.

A flow chart detailing a method 190, according to an exemplary embodiment of the present invention, of generating and distributing a customized dialer is illustrated in FIG. 2. At 200 the customization occurs, during which the customer utilizing, in one embodiment, a series of web pages, generated by the web server 100, specifies information (or parameters) for the customization of a dialer that will incorporate the customer's needs. At 205 of FIG. 2, generation of an executable file takes place upon the customer completing the customization process. The executable file is generated by the build server 110, the description of which follows. At 210 the distribution of the executable file to the end-users or to the distributor, which in turn distributes it to the end-users, takes place. The above-mentioned back-end processes of the method 190 are described in detail below.

Methodology: Customization by Customization Tool 120

In one exemplary embodiment, the customization tool 120 is a web application developed utilizing HTML, JavaScript, and JavaServlets.

The customization tool 120 presents a customer of the system 10 with a sequence of web pages that guide the customer through a process of building a customized dialer incorporating the customer's needs. The output of the customization process implemented by the customization tool 120 is a "profile" that defines a customization of a network connection application. Utilizing the customization process, a customer may define multiple customized network connection applications (e.g., dialers), each customized network connection application being described in terms of a profile.

Figure 3A:
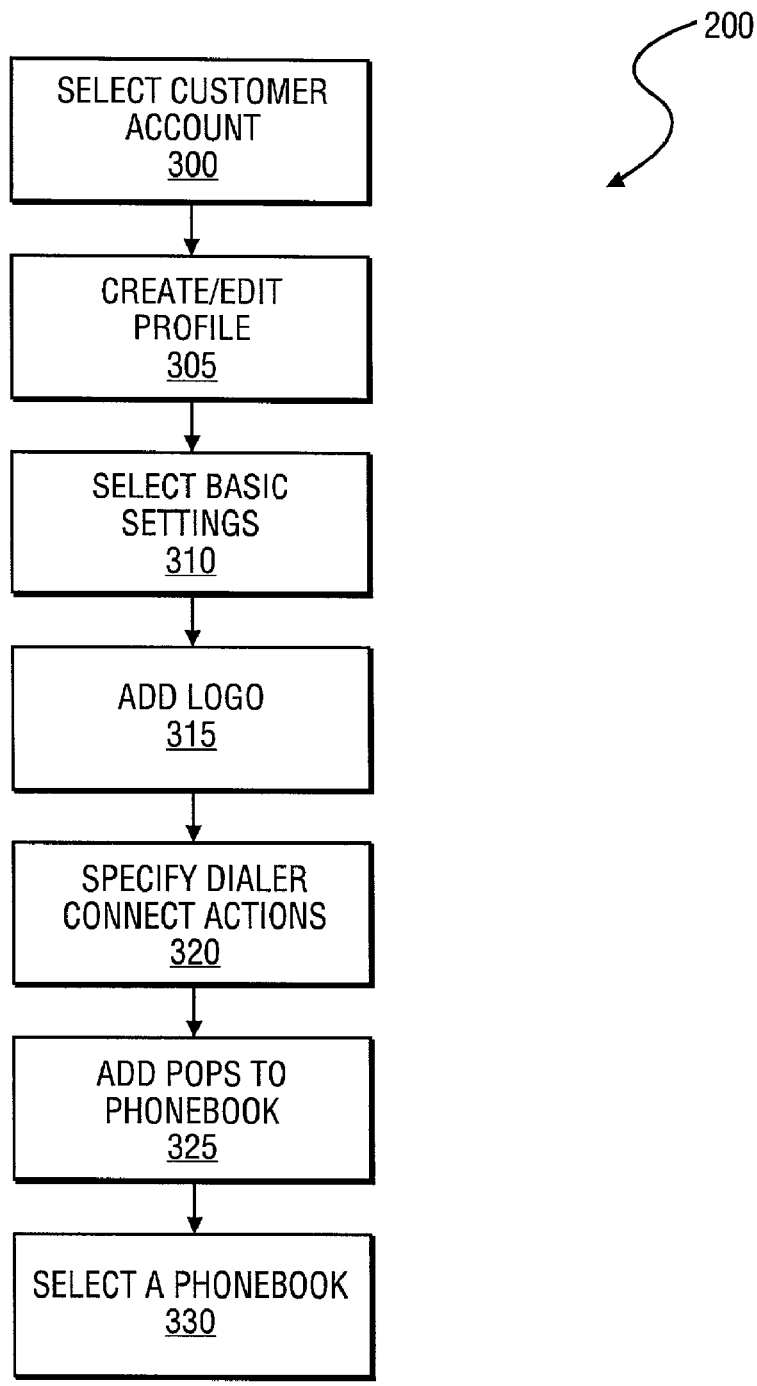
FIGS. 3A and 3B are flow diagrams illustrating a customization process of building a customized dialer according to one embodiment of the present invention.
Figure 3B:
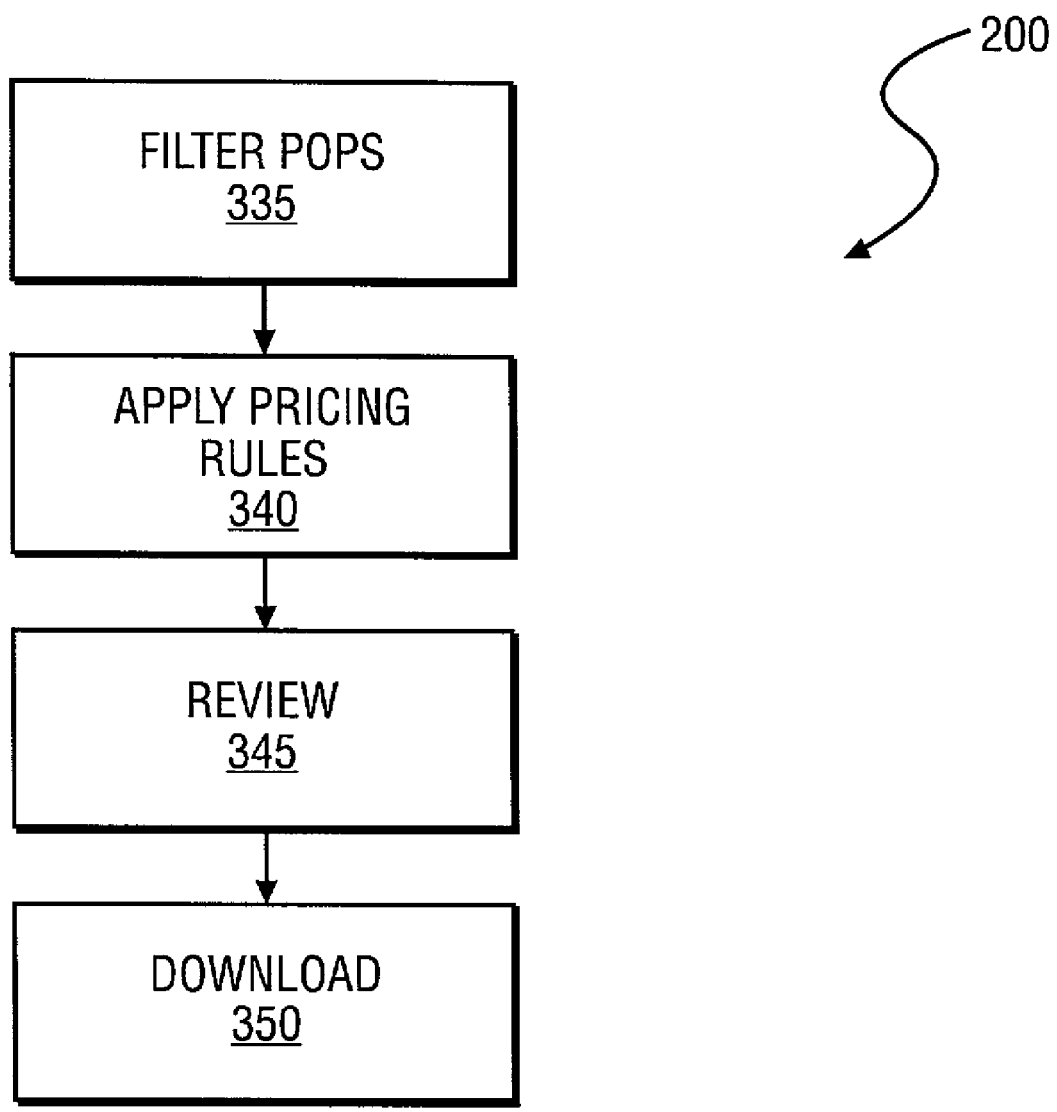

An exemplary embodiment of a customization process 200, implemented by the customization tool 120, is described with the reference to FIG. 3A and FIG. 3B. Upon the customer logging onto the customization system 10 system, the customer is presented with a sequence of web pages, generated by the web server 100 that facilitate the input of customization information specifying preferences of the customer. A first customization page 301, an example of which is illustrated in FIG. 4, is generated and presented at 300. The page 301 prompts the customer to select a customer account name under which all the customization information is stored. A partner code, representing an account number, may be automatically displayed after the customer login process. More specifically, the page 301 is utilized only for "channel" customers of a primary customer. The selected customer account name is a coded name for the channel customer for which a customer's dialer is to be generated, and the customization system 10 stores all customization information entered during the process 200 under the relevant customer account name.

At 305 the second web page 302, an example of which is illustrated in FIG. 5, is presented to the customer where the customer is prompted to select between the options of creating a new profile, or editing an existing profile.

A profile consists of all the files needed by the customization system 10 to create a complete, self-installing package distributable to a customer of the system 10, a distributor or directly to a customer's end-users. Customers may maximize or minimize the identification of the service or organization depending on what is included in a dialer profile. For example, the following features that are described in detail below may be included into a dialer profile: custom corporate logos, connection actions, addition and removal of access points (POPs), pricing setting.

The customer is presented with the third web page 303, an example of which is illustrated in FIG. 6, at 310 giving the customer an option to enter a default authentication domain, which will allow the end-users to enter only a end-user name and password in order to be connected to the network, without specifying a domain name. At the third web page 303, the customer may be prompted for the back-up Domain Name System (DNS) server IP address. The back-up DNS server may be used where a Point-of-Presence (POP), which an end-user has dialed into, does not automatically assign an IP address. In one embodiment of the present invention all POPs in the phonebook database 130 have dynamic DNS addressing. The customer may specify if he/she desires the end-users to have an option of saving their password in order to avoid entering it every time an end-user logs into the system.

The third web page 303 may also prompt the customer to specify if prices will be displayed next to each dial-in number when the dialer is invoked by the end-user. The customer may also desire to display prices in particular currencies. According to one embodiment of the present invention, the customer may enter a conversion rate in order for the dialer to display pricing in currency applicable to the end-users' geographical location.

Phonebook updates are uploaded to the end-user's machine upon establishment of a network connection through the dialer. The customer may, via the third web page 303, specify if it desires the end-users to choose a manual phonebook update instead of an automatic one.

Some customers may desire to limit network connection sessions of the end-users. The third web page 303 allows customers to specify the maximum connect time that the customer desires the end-users to have. In one embodiment, an unlimited option may be available for the customers to select.

In one embodiment of the present invention the dialer will be installed on end-users' machines with a default shortcut name. Via the third web page 303, the customer may specify its own shortcut name, for example, the name of the company.

Figures 7A, 7B, 8:
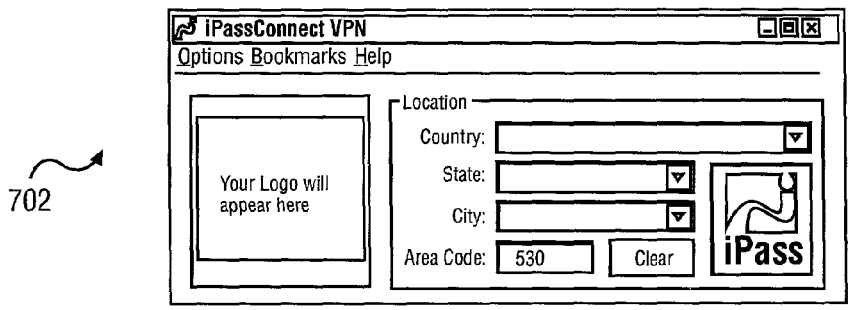
FIGS. 7A and 7B show graphical end-user interfaces presented to the customer to allow addition of a logo to the customized dialer according to one embodiment of the present invention.
FIG. 8 is a graphical user-interface presented to the customer to allow specification of dialer connection actions according to one embodiment of the present invention.

Upon selection of the options displayed at the third web page 303, the customer at 315 is presented with the fourth web page 304, an example of which is illustrated in FIG. 7A, allowing the customer to add a personalized logo to the dialer application distributed to the end-users.

FIG. 7B illustrates an exemplary end-user interface 702, generated by a dialer, that displays a selected logo to an end-user when the dialer is invoked.

In one embodiment, at 320 the customer is presented with a fourth web page 800, an example of which is illustrated in FIG. 8, allowing the customer to specify the dialer connect actions. Dialer connect actions are additional programs that may be executed at various points when the end-users connect to the Internet utilizing the customized dialer. For example, a connect action may be an automatic establishment of a VPN connection after the end-user connects to the Internet. According to one embodiment of the present invention, the customer may specify connect actions to execute at six different points during the end-user's connection process. Those actions may be a PostConnect action specifying programs to be executed after the connection is established; a PreConnect action specifying programs to execute prior to the establishment of the network connection; a PreDial action specifying programs to run immediately prior to dialing a point of access number; an OnError action specifying programs to run in case an error occurs; an OnCancel action specifying programs to run when the end-user decides to cancel a connection session; and Disconnect action specifying programs to run when the end-user disconnects from the Internet.

In box 810 of FIG. 8 the customer is presented with a drop-down menu to select an action type from the list described above to be added to a dialer profile. The description box 815 allows the customer to enter a short description of the programs that the customer wants to be executed. At box 820 the customer may specify the sequence in which the connect action to be executed. In a case where the connect actions are asynchronous, or there is only one action, the sequence of execution is not important. In box 825 the customer may specify the name of the program to be launched at a particular connect action. The customer is presented with a browse feature in order to specify the exact name of the program. The customer may specify the parameters, including the command line parameters, necessary to run the program in box 830. At box 835 the customer may specify that a program does not need to be loaded with the dialer to the end-users' machines. In one embodiment, the programs that need to be run at particular connect actions may be already installed on the end-users' machines. In one embodiment, the customers may select a sequence of connect action to run at the same time (asynchronous mode), or one after the other (synchronous mode) at 840. If the programs are running in synchronous mode, one program must completely finish executing before the next one can be launched in synchronous mode. In one embodiment if an error occurred while executing one of the programs, the connect action to be executed after the program may not be launched. At box 845, the customer may identify the POPs for which the connect actions should run. In one embodiment, the customer is presented with an option to create additional connect actions or to delete the existing ones.

In one embodiment of the present invention, the customized dialer may be configured to launch Microsoft's VPN (PPTP) after a successful connection is established. PPTP support may be built into the customized dialer and not require any additional client software.

Figure 9:
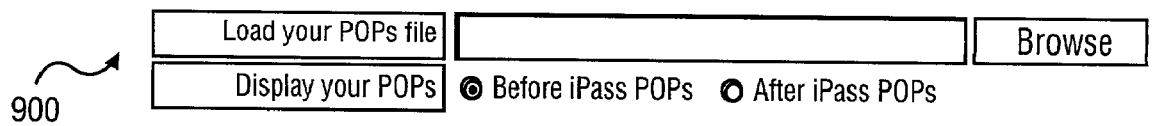
FIG. 9 is a graphical user-interface presented to the customer to allow addition of customer POPs to a dialer phonebook according to one embodiment of the present invention.

At 325 of FIG. 3A, the customer may add POPs to a phonebook, stored in the phonebook database 130, utilizing the sixth web page 900, an example of which is illustrated in FIG. 9. In one embodiment, the list of POPs to be added to the phonebook of the customization center 10 may be created through a text editor. Each POP to be added may be identified by the following parameters: a country code that may be represented in a 2-letter code; the POP's region identification number or state identification number; the city in which the POP is located; the area code of the phone number for the POP; the phone number for the POP, without the area code; the maximum analog speed supported by the POP; identification of whether one channel or two channel ISDN is available or if no ISDN is available for the POP to be added; identification of whether Password Authentication Protocol (PAP) is available; identification of whether Challenge Handshake Authentication Protocol (CHAP) is available; the price to be charged for the utilization of the POP; the prefix used for routing the authentication request; the suffix to be used for routing the authentication request; a script name of a file containing a series of commands, parameters and expressions required to establish the connection via the POP.

Figure 10:
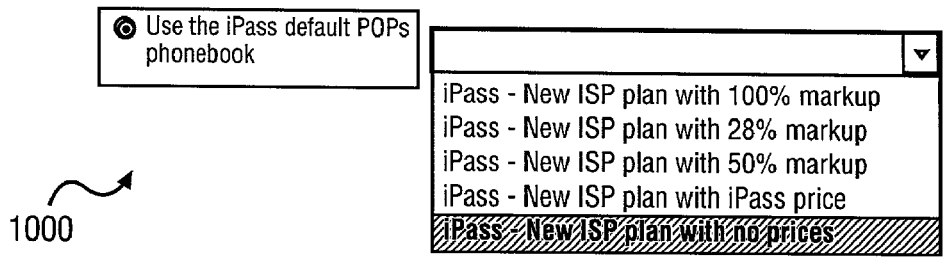
FIG. 10 is a graphical user-interface presented to the customer to allow making of the dialer phonebook according to one embodiment of the present invention.
Figure 11:
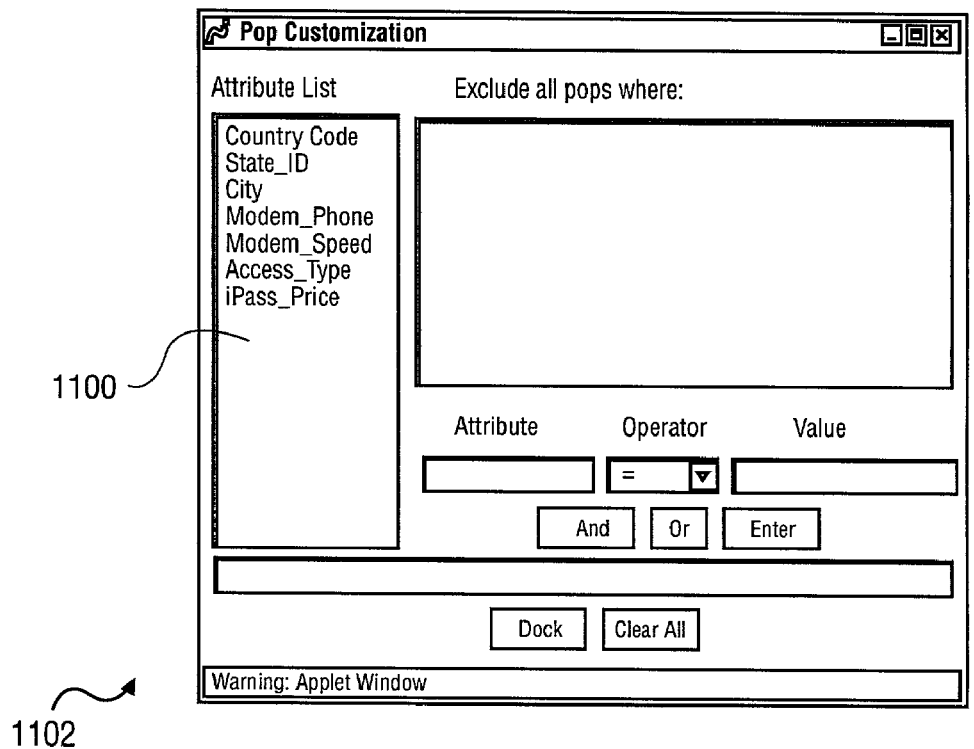
FIG. 11 is a graphical user-interface presented to the customer to allow specification of POP filter rules according to one embodiment of the present invention.

At 330 of FIG. 3A, the tool 120 presents a list of phonebooks that are valid for the customer as per the pricing plan associated to the customer. The list of phonebooks may be presented via a drop-down menu of a web page 1000, an example of which is illustrated in FIG. 10. These phonebooks contain all the POPs in a service provider network, excluding the POPs filtered as per the filtering value associated to the pricing plan (see block 1540 in FIG. 15). The customer can further apply custom filtering and pricing rules to the phonebooks to arrive at their customized phonebooks. For some plans, the tool 120 may generate phonebooks that have price markups. The example web page 1000, shown in FIG. 10, provides examples of such markups. At 335 the customer is presented with an eighth web page 1102, an example of which is illustrated in FIG. 11, through which the customer may specify filter rules for various POPs. In box 1100 the customer is presented with a list of the attributes that may be used in filtering the list of POPs presented to the end-users. In one embodiment, the filter rules may be the Structures Query Language (SQL) where clauses. The filtering rules may be generated utilizing a list of the attributes including, but not limited to: country code; the region or state identification of a POP; the city in which the POP is located; the phone number of the POP without an area code; the maximum analog speed supported by the POP; the price of the POP; identification if one channel or two channel ISDN is available or if no ISDN is available for the POP to be added. For example, in order to filter all POPs located in the Russian Federation, a filter rule may specify: Country Code ='RU', where 'RU' is the 2-letter code for the Russian Federation.

At 340 the customer is presented with a ninth web page 1200, an example of which is illustrated in FIG. 12, that allows the customer to specify pricing rules to be applied to the prices of the POPs in the customization system phonebook. Two types of the pricing rules may be available to the customer according to one embodiment of the present invention: the percentage markup or slab pricing. If percentage markup pricing is selected, the system 10 applies a specified markup percentage to the POP price listed in the customization system phonebook. The slab pricing applies a pricing formula specified by the customer to the listed prices in the customization system phonebook. For example, the customer may specify a particular amount to be added to a listed POP price if the listed price is within the customer-specified price range and a different amount to be added if the listed price is outside the customer-specified range. In one embodiment, the customer may also specify different rules for the POPs currently listed in the phonebook and the POPs that are going to be added to the phonebook in the future. In another embodiment of the present invention, the customer may specify different pricing rules for different countries.

At 345 of FIG. 3B the customer is presented with a review web page 1300, an example of which is illustrated in FIG. 13, that shows the details of the customization process that was performed by the customer. If the customer is not satisfied with the details he or she may edit a dialer profile to make desired changes to the customization. If the customer is satisfied with the dialer profile he/she may click on the Build Dialer button 1302 in order to build a dialer according to the customer-specified customization information. Upon the customer requesting to build the customized dialer, the customization information is sent to the build server 110. The build server 110 generates a self-extracting (or self-installing) executable file that is capable of being distributed to the customer, a specified distributor or directly to the customer's end-users in order to provide the end-users with the Internet access through the customized dialer. In one embodiment of the present invention, upon the end-users connection to the system 10 utilizing the dialer, the build server 110 dynamically adds new files and removes outdated files utilizing the version numbers associated with each file and dynamically generates a self-extracting executable that replaces an outdated end-user's dialer file. This update process is described in more detail below.

At 350 the customer is presented with the download web page 1400, an example of which is illustrated in FIG. 14. The web page 1400 contains the list of files that are necessary to publish the customized dialer to the end users. In one embodiment those files are executable installation file generated by the build server 110, a phonebook file containing all the POPs in the customized phonebook, a zip phonebook file containing Perl scripts and data files necessary to generate smaller HTML files per each country, a phonebook file containing phonebooks in CSV and ASCII format and a Macintosh phonebook file which is in a format compatible with the Macintosh dialers.

In one embodiment, the customization system 10 utilizes the pricing and access point data maintained by a settlement system that described in detail in a co-pending patent application Ser. No. 09/791,239, titled "A Method and System to Facilitate Financial Settlement of Service Access Between Multiple Parties". The pricing data maintained by the settlement system specifies the method of pricing of a POP according to a particular pricing plan. The customization system 10, in one embodiment, retrieves a contract of a customer and the list of available phonebooks for the retrieved customer pricing plan.

In one embodiment, the customer may specify the rules for the termination of a connection if it is determined to be idle. The decision to terminate the connection may depend on the specified allowed duration of the idle connection before its termination, on the allowed minimum data transfer rate before the connection is terminated (this may be used to discount certain background traffic, which does not represent real end-user activity), on the allowed time to respond to a dialog box to renew the connection by the end-user before the connection is terminated. In one embodiment the absolute limit may be set on the length of sessions, regardless of the connection activity as described above.

In one embodiment of the present invention, the customer may require the customized dialer to support foreign languages through the use of external language resources and help files. In one embodiment at runtime, the customized dialer may determine the language of the operating system installed on the end-user's machine and load the associated language resource and help files stored at the end-user's machine. If external files are not found, the customized dialer may use the default language, i.e. English.

In one embodiment security information, such as end-user password, VPN password, calling card PIN, stored locally on the end-user's system may be encrypted using standard encryption algorithms well know in the art.

It will be appreciated that the above-described customization process need not be implemented utilizing a series of web pages. In one embodiment the customization may be performed through a software application and the customization information may then be uploaded to the centralized customization tool through a network.

Methodology: Update

In one embodiment of the present invention, the customization tool 120 updates multiple copies of a network connection application (e.g., a dialer) distributed by the customer to the end-users automatically upon each end-user connecting to a network access point. In an alternative embodiment, an end-user may manually invoke the update feature of the customized dialer distributed to him/her by the customer. During the update process, the client dialer contacts the update server 113 and retrieves the list of files and their latest version numbers. The dialer compares the list of files stored locally with the list retrieved from the server 113. If the list and/or the version numbers don't match, the dialer retrieves the affected files from the update server 113. In one embodiment of the present invention, the new build executable and DLL files are downloaded to the client machine and stored in temporary locations due to inefficiency of updating dialer files when the dialer is running. Upon the end-user exiting the dialer, the files on the client machine are updated to the files containing newer information.

In one embodiment the customer may not want the end-users to have access to the latest changes until, for example, the testing of all the new POPs is performed. In such a case the customer may instruct the customization system 10 not to update the dialer automatically unless instructed otherwise.

Methodology: Phonebook Generation

Figure 15:
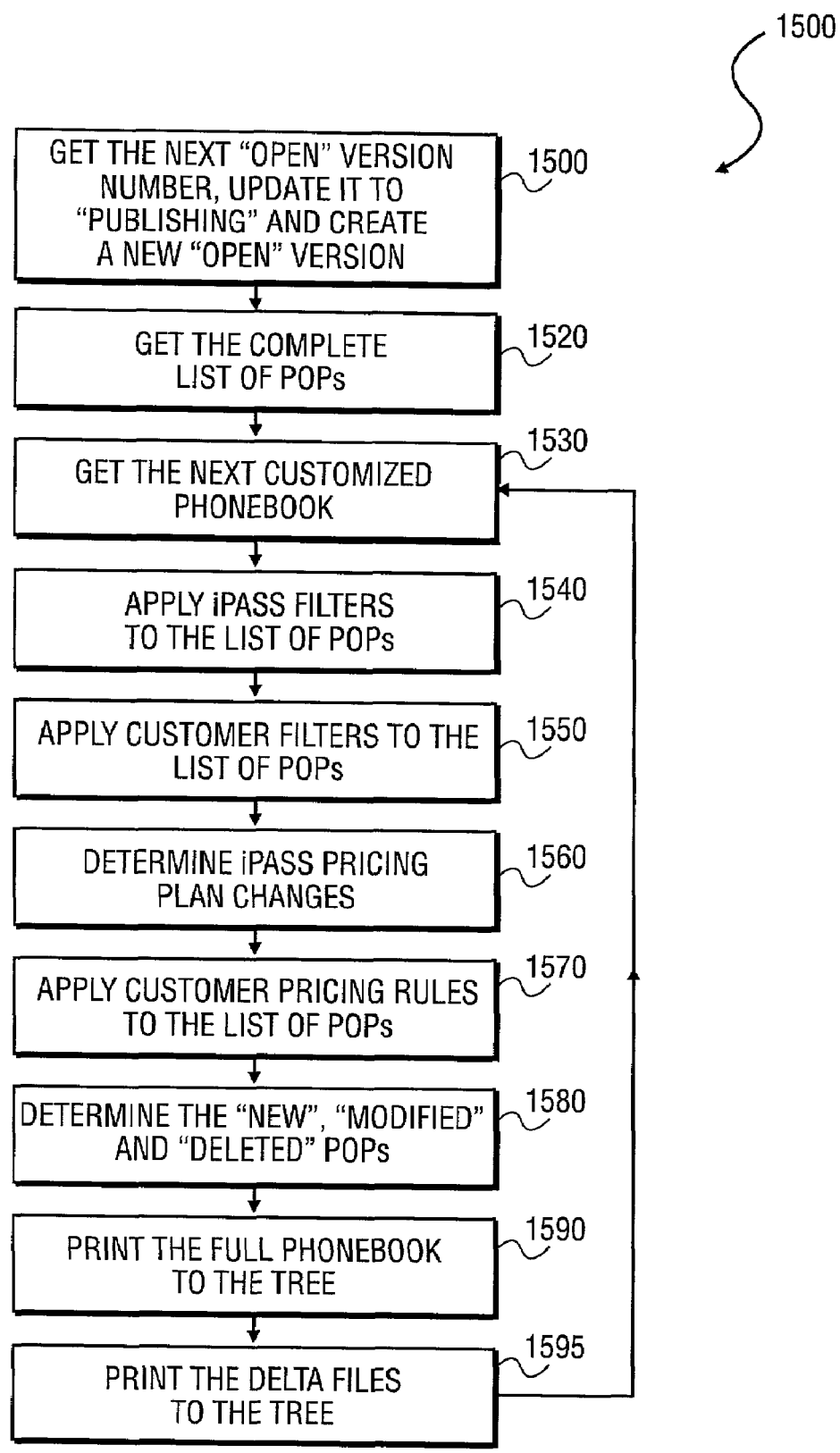
FIG. 15 is a flow chart detailing a phonebook generation process performed by a phonebook generation tool.
Figure 16:
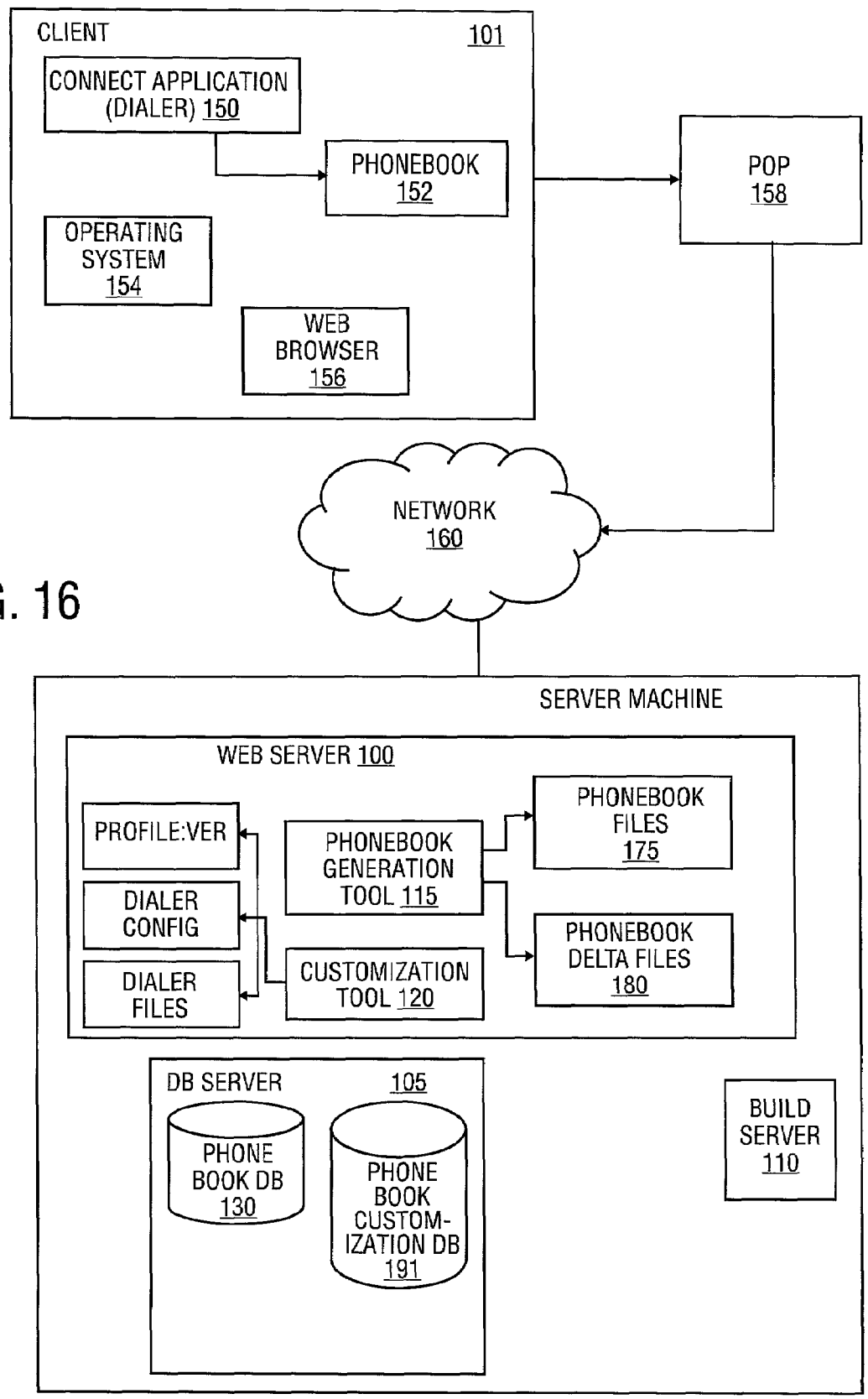
FIG. 16 is a diagram of a system architecture according to one embodiment of the present invention.

FIG. 15 is a flow chart illustrating a method 1500, according to an exemplary embodiment of the present invention, that is performed by the phonebook generation tool 115 to create a phonebook and phonebook delta files 175 and 180, illustrated in FIG. 16. In one embodiment, the phonebook generation tool 115 is a Java application that uses a database to store and manipulate phonebook data. The tool 115 may communicate with the database utilizing the JDBC protocol. The tool 115 furthermore publishes the generated phonebook and phonebook delta files 175 and 180 to the file system on the web server 100 for publication.

The generated phonebook files 175 may be customized according to the needs of a customer, (e.g., a particular POPs may be filtered or removed, and rules may be established for the pricing of POPs).

A phonebook management system (not shown) maintains a current "open" phonebook version number and tags changes with this version number. Each run of the phonebook generation tool 115 increases this phonebook version by one. When the phonebook generation tool 115 runs, it closes the current "open" phonebook version number, and opens a new "open" phonebook version. All subsequent changes to the phonebook database are tagged with the new "open" phonebook version number.

The phonebook generation tool 115 determines changes to the phonebook database since the last run of the tool 115, and generates phonebook and phonebook delta files 175 and 180.

A more detailed description will now be provided with reference to FIG. 15.

In one embodiment, the phonebook generation tool 115 generates delta files that contain cumulative changes to the phonebook database 130 since the last version of the phonebooks was published. In one embodiment if the size of the delta files is greater than 75% of the size of the whole phonebook, the delta files are not generated.

Referring to FIG. 15, at 1510 the phonebook generation tool 115 creates the next open version phonebook number and updates the current phonebook version to publishing and creates a new open version phonebook. At 1520, the phonebook generation tool 115 retrieves the complete list of POPs from the server. Upon retrieval of the complete POP list the phonebook generation tool 115 at 1530 retrieves the latest customized phonebook. Application of the default filters to the list of POPs (for example, customer location filters) occurs at 1540. At 1550 the phonebook generation tool 115 applies customer-specified filters to the list of POPs (e.g., eliminates some of the countries that the customer specifically requested to be excluded from the available POPs). At 1560 the phonebook generation tool 115 determines if the pricing plans for particular POPs have changed. If positive then the necessary corrections are made to the list of POPs. In some instances the customer may specify his/her own pricing rules, for example, to eliminate POPs for which the price is higher than the customer specified limit. These customer pricing rules are applied at 1570. Upon application of the above-described rules, the phonebook generation tool 115 determines the new, modified and deleted POPs at 1580. At 1590, the new POPs list is printed to a full phonebook tree with the new open version phonebook number, and at box 1595 the delta files 180 are printed into a delta files tree. In one embodiment the phonebook and delta trees are stored at the web server 100.

All the files are associated with a version number in order to facilitate a more efficient update process described above.

The phonebook generation tool 115 utilizes "pricing" and "access point" data maintained in the access point and pricing databases 136 and 137 illustrated in FIG. 1B. The pricing data includes buy and sell prices for all access points. Sell prices for access points combined with a number of other pricing parameters constitute a "pricing plan". Each phonebook, for which a record is maintained within the phonebook database 130, has a pricing plan associated therewith. Access point information includes all POP related information. When access point information is modified, this data is tagged with the latest "open" version number.

Methodology: Customization by the End-users of the Customers

In one embodiment of the present invention, the end-user invokes a customized network connection application in the form of a dialer 150 on the client machine 101 of FIG. 16.

Figure 17:
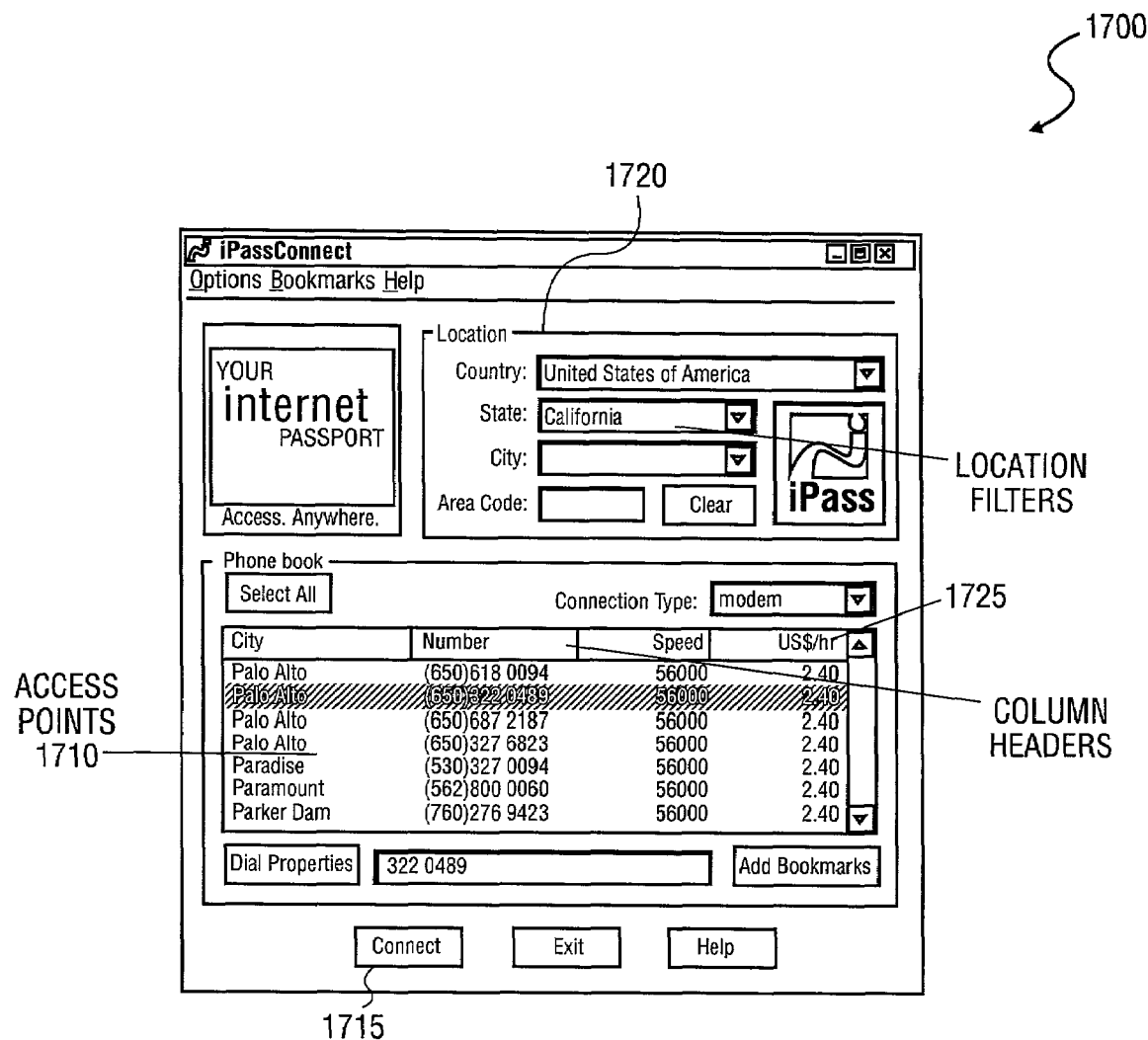
FIG. 17 is a graphical end-user interface presented on a client machine that constitutes a main dialog box of a dialer according to one embodiment of the present invention.

FIG. 17 illustrates a main dialog box 1700 of the customized dialer 150, according to one embodiment, that is presented to the end-user upon invocation of the dialer 150. To establish a dial-up connection the end-user may select an access point from the list of all the available access points presented to him/her in box 1710. In order not to display the list of all available access points, most of which will be long distance calls, the end-user may enter his/her location in box 1720. The customized dialer 150, in one embodiment of the present invention, filters the list of access points based on the end-user's location and displays only the closest points of access in box 1710. Upon selection of an access point, the end-user may click on a connection button 1715 in order to instruct the customized dialer 150 to establish a network connection via the selected access point. In one embodiment of the present invention, the access points displayed in box 1710 may be sorted by city name. Alternatively, the enduser may sort the access points list by phone numbers, connection speed, or price by clicking on the corresponding column headings. For example, to sort by price the end-user may click on box 1725.

Figure 18:
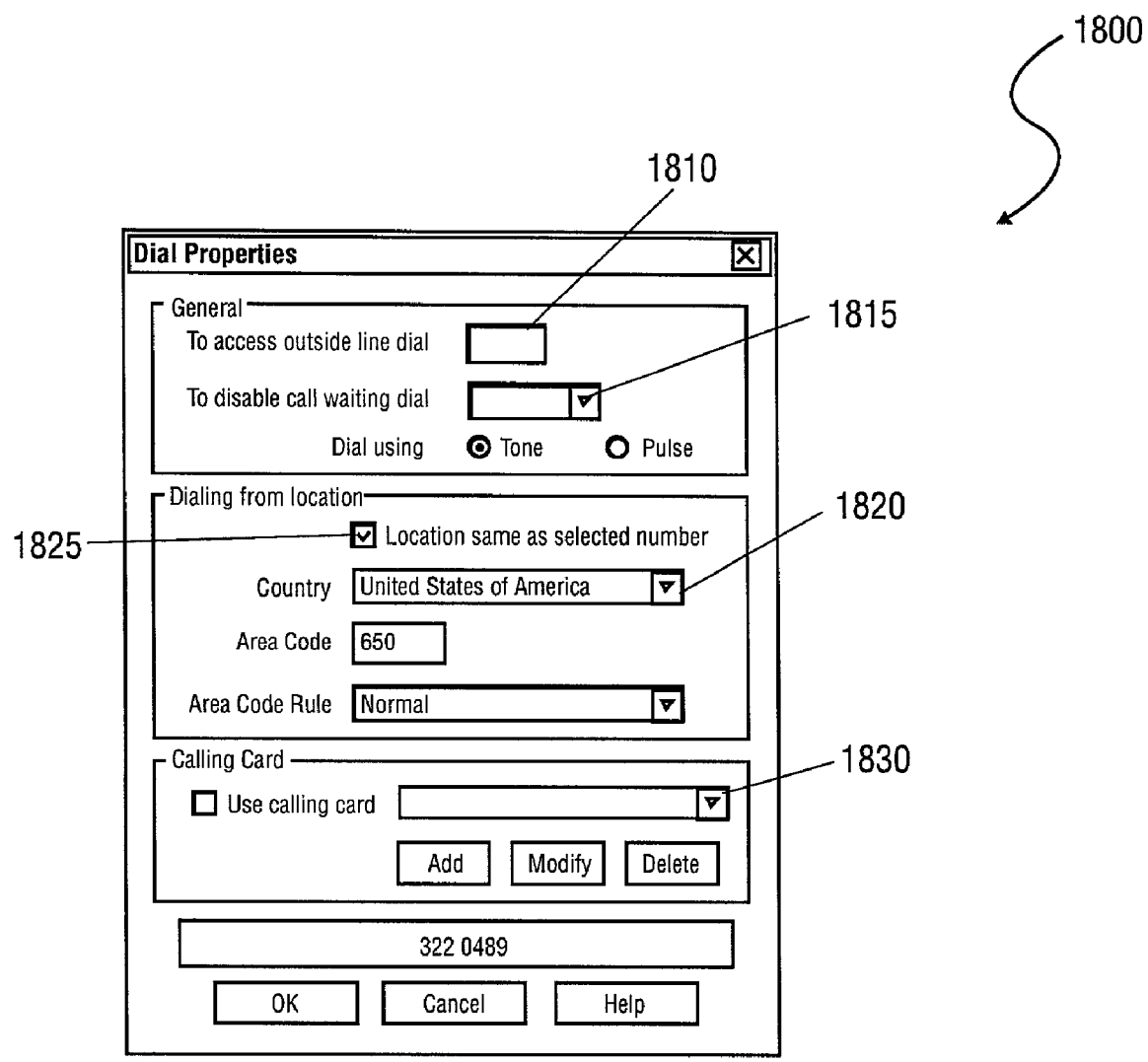
FIG. 18 is a graphical end-user interface presented on the client machine that allows an end-user to specify dial properties according to one embodiment of the present invention.

The end-user may specify the dialing settings to use by the customized dialer 150 when establishing a remote network connection. FIG. 18 illustrates an exemplary dial properties dialog box 1800 that is presented to the end-user. Facilities using private branch exchange (PBX) (e.g., a private telephone network users of which share a number of outside lines), usually require an access code to obtain an outside line. Thus, in box 1810, the end-user is prompted to enter an outside line code. Some phone lines are setup with a call waiting feature, which in one embodiment may need to be disabled prior to establishing a data connection. The end-user may enter in box 1815 a phone number to dial in order to disable the call waiting feature. In box 1820 the end-user may enter the country and area code from which the end-user is dialing; this information is used by the customized dialer 150 to determine if an area code, a country code or an access code need to be dialed in order to establish a network connection via the end-user-selected access point. In one embodiment, if check box 1825 is checked by the end-user, the selected number will automatically be dialed as a local number. Calling card information may be entered in box 1830 to be used when dialing the end-user-selected access point number. Each calling card may be defined by a name, access number, PIN and a dialing rule.

Figure 19:
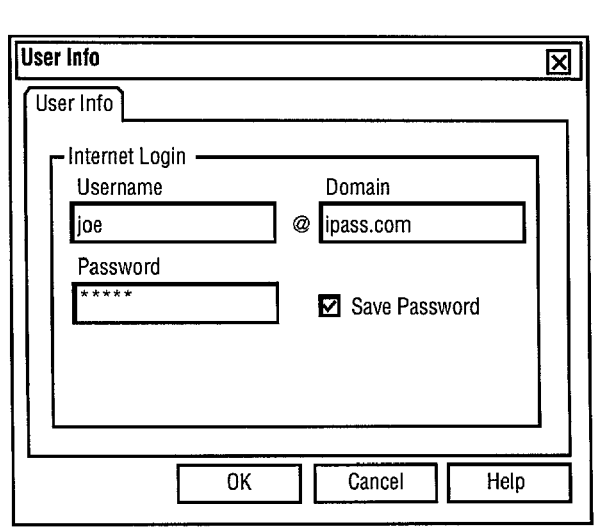
FIG. 19 is a graphical end-user interface presented on the client machine that prompts the end-user for end-user information according to one embodiment of the present invention.

In order for the customized dialer 150 to establish the connection with the Internet, the end-user's information such as username, domain and password should be available. End-user information dialog box 1900 illustrated in FIG. 19 prompts the end-user for such information. In one embodiment the end-user information dialog box 1900 is automatically displayed if the end-user dials an access point without providing all the required end-user information.

Figure 20:
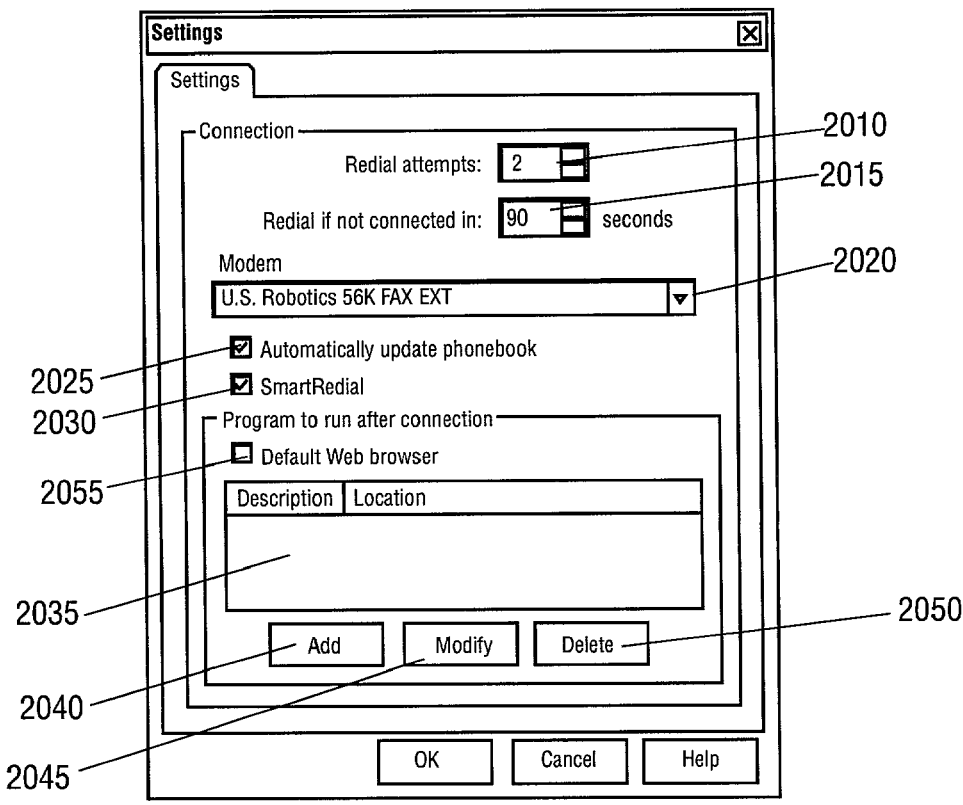
FIG. 20 is a graphical end-user interface presented on the client machine that allows the end-user to specify settings of the dialer according to one embodiment of the present invention.

The setting dialog box 2000 illustrated in FIG. 20 allows the end-user, in one embodiment of the present invention, to specify settings used in establishing the remote connection. The end-user may specify in box 2010 the number of redial attempts to be made by the customized dialer 150 when the network connection may not be established from the first dialing attempt. Alternatively, in box 2015 the end-user may specify the duration of an attempt to establish the connection before redialing. For example, the end-user may desire for the customized dialer 150 to redial the same or different access point number if connection is not established within 90 seconds. Depending on the device used for the dial-up connection particular features of the customized dialer 150 may need to be invoked, thus the end-user may specify the dialing-up device that he/she may select from the drop down menu 2020.

In one embodiment, the end-user may select an option of automatic update of the phonebook upon establishment of the network connection by check box 2025. This will ensure that the latest network access numbers are used next time the end-user invokes the customized dialer 150. A "smart redial" option, when enabled by the end-user check box 2030, directs the customized dialer 150 to dial another number in the same city when the dial-up attempt failed using the first network access number. In one embodiment the end-user may wish to run particular applications upon the establishment of the network connection, for example a Web browser, such as Internet Explorer™ (Microsoft Corporation). Instead of opening desired applications manually, the end-user may direct the customized dialer 150 automatically to launch specified applications when the network connection is established by adding software applications to box 2035 utilizing Add 2040, Modify 2045 and Delete 2050 buttons illustrated in FIG. 20. In another embodiment of the present invention, the end-user may select an option of launching a default web browser once the connection is established by checking on the Default Web Browser box 2055.

Figure 21:
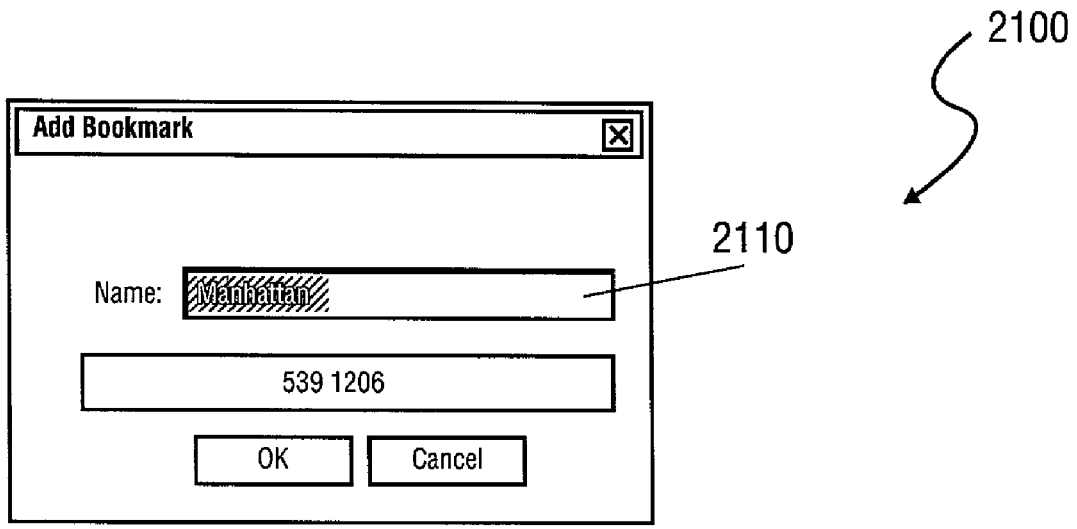
FIGS. 21 and 22 show graphical end-user interfaces presented on the client machine that allows the end-user to add and modify bookmarks according to one embodiment of the present invention.
Figure 22:
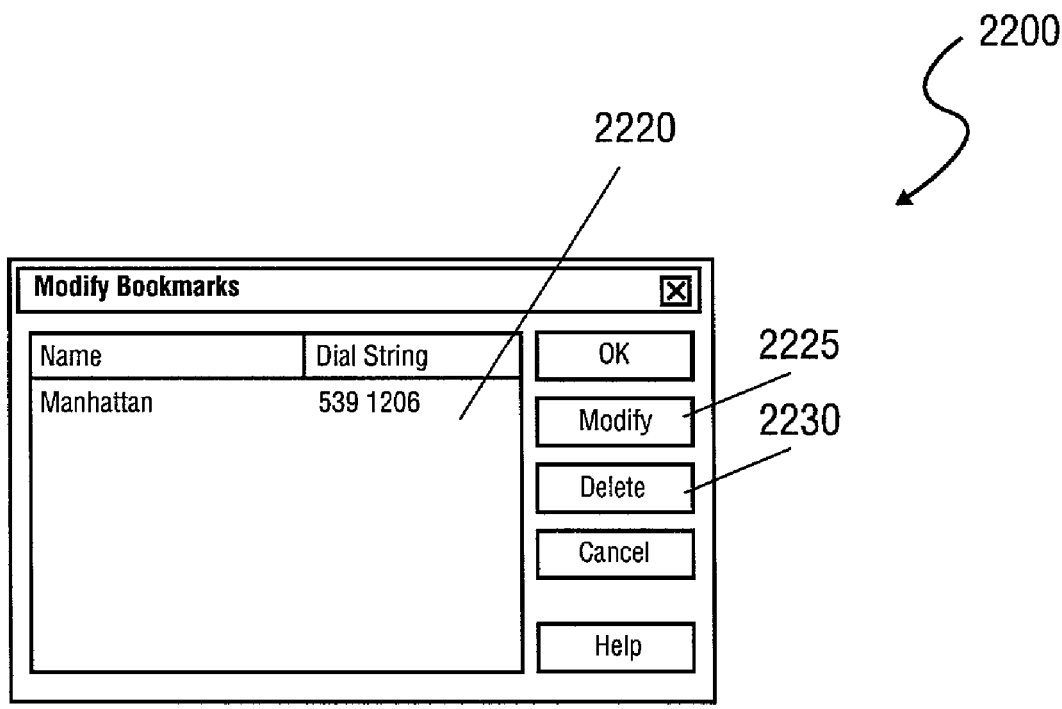

In one embodiment of the present invention, the end-user may bookmark the access points that are most often used. FIG. 21 illustrates an exemplary dialog box 2100 that the end-user may use in order to compile a list of favorite network access points. Window 2110 allows the end-user to add a bookmark by entering the location of the access point. FIG. 22 illustrates an exemplary dialog box 2200 that an end-user may utilize to modify a list of favorite network access points. Window 2220 allows the end-user to modify the list of bookmarks by providing a Modify option 2225 to change the properties of a bookmark and a Delete option 2230 to remove a bookmark from the list.

In one embodiment of the present invention, the end-user may access an online help feature from any dialog boxes described above by clicking on a Help button.

Some settings may be saved in the configuration files on the client machine 101 when the end-user exits the customized dialer 150. The saved settings may be location filters (country, state, city, area code), connection type (modem, ISDN), selected access points, dial properties including dialing prefixes, the location of the end-user and calling card information, end-user information including end-user name, domain name and password and modem settings including redial attempts, redial timeout, modem device, update phonebook selected options, SmartRedial, bookmarks and programs to launch after the connection is established.

Certain area codes in the Unites States require 10/11-digit dialing when placing calls within the area code. These dialing requirements are very regional and are constantly changing. In one embodiment of the present invention, a dialing rule file is downloaded to the client machine 101 along with the distribution of the customized dialer 150, containing all the area codes that require 10/11 digit dialing.

FIG. 23 is a diagrammatic representation of three exemplary protocols and hardware components of three exemplary access methods, supported by network connection applications according to respective exemplary embodiments of the present invention. Specifically, a modem dialup access method is illustrated at 2300, a wireless broadband access method is illustrated at 2302 and a wired broadband access method is illustrated at 2304. As mentioned above, the present invention is not restricted to the generation, updating and distribution of a dialer for establishing a modem dialup connection, and extends to a method and system for generating, updating and/or distributing a network connection application for establishing a network connection between the two machines.

In the foregoing specification the present invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

Computer System

Figure 24:
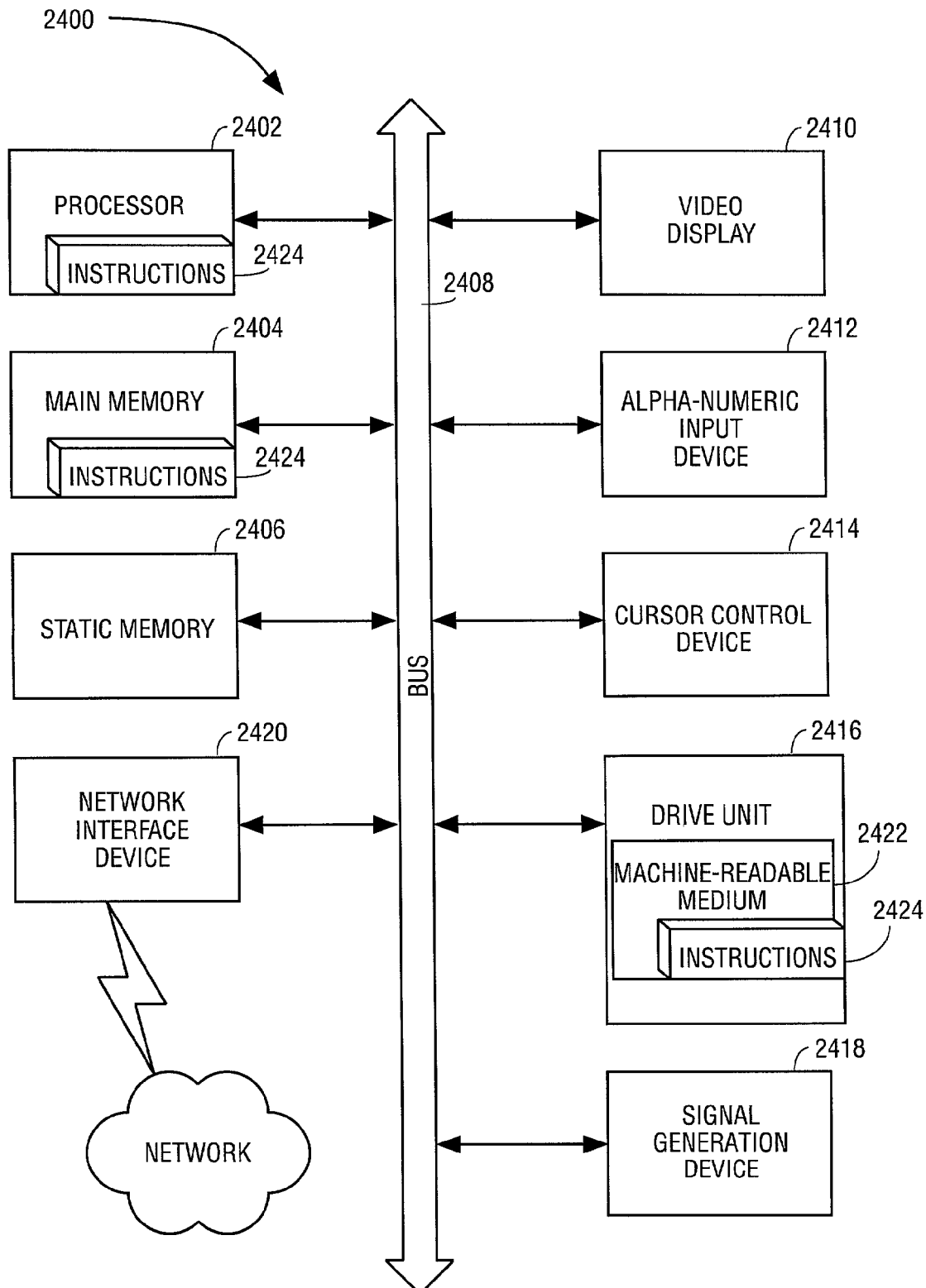
FIG. 24 is a diagrammatic representation of a machine, in an exemplary form of a computer system, for executing a sequence of instructions stored on a machine-readable medium, the sequence of instructions causing the machine to perform any of the methodologies described herein.

FIG. 24 is a diagrammatic representation of a machine in the form of computer system 2400 within which software, in the form of a series of machine-readable instructions, for performing any one of the methods discussed above may be executed. The computer system 2400 includes a processor 2402, a main memory 2404 and a static memory 2406, which communicate via a bus 2408. The computer system 2400 is further shown to include a video display unit 2410 (e.g., a liquid crystal display (LCD) or a cathode ray tube (CRT)). The computer system 2400 also includes an alphanumeric input device 2412 (e.g., a keyboard), a cursor control device 2414 (e.g., a mouse), a disk drive unit 2416, a signal generation device 2418 (e.g., a speaker) and a network interface device 2420. The disk drive unit 2416 accommodates a machine-readable medium 2422 on which software 2424 embodying any one of the methods described above is stored. The software 2424 is shown to also reside, completely or at least partially, within the main memory 2404 and/or within the processor 2402. The software 2424 may furthermore be transmitted or received by the network interface device 2420. For the purposes of the present specification, the term "machine-readable medium" shall be taken to include any medium that is capable of storing or encoding a sequence of instructions for execution by a machine, such as the computer system 2400, and that causes the machine to perform the methods of the present invention. The term "machine-readable medium" shall be taken to include, but not be limited to, solid-state memories, optical and magnetic disks, and carrier wave signals.

If written in a programming language conforming to a recognized standard, the software 2424 can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine, such as the computer system 2400, causes the machine to perform an action or produce a result.

The preceding description of FIG. 24 is intended to provide an overview of computer hardware and other operating components suitable for implementing the invention, but is not intended to limit the applicable environments. One of skill in the art will immediately appreciate that the invention can be practiced with computer architectures and configurations other than that shown in FIG. 24, including hand-held devices, multiprocessor systems, microprocessor-based or programmable consumer electronics, network PCs, minicomputers, mainframe computers, and the like. A typical computer system will usually include at least a processor, memory, and a bus coupling the memory to the processor. The invention can also be practiced in distributed computing environments where tasks are performed by remote processing devices that are linked through a communications network.

What is claimed is:

1. A method to manage a customized network connection application, the method comprising:
    receiving, at a customization system, customization information pertaining to the customized network connection application, where the customization information is received from a customer of the customization system via a plurality of input interfaces;
    storing the customization information as a profile associated with the customized network connection application;
    generating, utilizing the profile, the customized network connection application;
    distributing the customized network connection application to end-users associated with the customer, wherein the customer is configured to provide Internet access to the end-users using the customized network connection application;
    subsequent to the distribution of the customized network connection application, receiving further customization information indicating a modification to the profile associated with the customized network connection application;
    updating the customized network application in accordance with the modification to the profile; and
    distributing the updated customized network connection application to the end-users associated with the customer.

2. The method of claim 1, wherein the customized network connection application is distributed as a self-installing executable.

3. The method of claim 1, wherein the plurality of input interfaces include a plurality of markup language documents, the method further comprising,
    communicating the plurality of markup language documents to a computer system accessed by the customer.

4. The method of claim 1 wherein the customization information includes pricing information indicating whether the customized network connection application displays a connection price associated with at least one network connection point accessible utilizing the customized network connection application.

5. The method of claim 4 wherein the pricing information specifies a currency in which the connection price is displayed by the customized network connection application.

6. The method of claim 5 wherein the pricing information specifies a conversion rate to be applied when the connection price is displayed in the specified currency.

7. The method of claim 4 wherein the connection price is based on a basic connection price specified in a pricing plan associated with the customer and negotiated between the customer and a network access provider.

8. The method of claim 1 wherein the customization information includes network access point information identifying a plurality of network access points to which the customized network connection application is authorized to establish a network connection.

9. The method of claim 8 wherein the network access point information includes Point of Presence (POP) information identifying at least one Point of Presence.

10. The method of claim 9 wherein the Point of Presence information includes any one of a group of information items including a country identifier, a region identifier, a city identifier, an area identifier, a telephone number, a maximum connection speed, and price information indicating a price for accessing the at least one Point of Presence.

11. The method of claim 1 wherein the customized network connection application is authorized to use any one of a collection of network access points to establish a network connection, and wherein the customization information includes update information indicating whether the customized network connection application is to update the collection of network access points.

12. The method of claim 11 wherein the collection of network access points includes a collection of Points of Presence (POPs).

13. The method of claim 1 wherein the customization information includes session limit information indicating a limited amount of time for which a network connection may be established utilizing the customized network connection application.

14. The method of claim 1 wherein the customization information includes connection mode information indicating a mode by which the customized network connection application establishes a network connection.

15. The method of claim 14 wherein the connection mode information indicates any one of a group of connection modes including a modem connection, an ISDN connection, a wireless broadband connection, and a wired broadband connection.

16. The method of claim 1 wherein the customization information includes a logo to be displayed by an interface of the customized network connection application.

17. The method of claim 1 wherein the customization information includes post-connect action information identifying at least one action to be performed subsequent to establishment of a network connection by the customized network connection application.

18. The method of claim 1 wherein the customization information includes pre-connect action information identifying at least one action to be performed prior to establishment of a network connection by the customized network connection application.

19. The method of claim 1 wherein the customization information includes error action information identifying at least one action to be performed upon occurrence of an error in an establishment of a network connection by the customized network connection application.

20. The method of claim 1 wherein the customization information includes disconnect action information identifying at least one action to be performed upon disconnect of a network connection established by the customized network connection application.

21. The method of claim 1 wherein the customization information includes phonebook information identifying at least one phonebook providing a markup on a basic connection price charged by a network access provider, and to be included in a total connection price to be charged to an end-user of the customized network connection application.

22. The method of claim 21 wherein the markup is expressed as a percentage of the basic connection price.

23. The method of claim 21 wherein the total connection price includes a sum of the basic connection price, and wherein and the markup is displayed to the end-user via an interface of the customized network connection application.

24. The method of claim 1 wherein the customization information includes network access point filter information providing criteria to filter network access points that are accessible utilizing the customized network connection application.

25. The method of claim 24 wherein the criteria include any one of a group of criteria including a country, a state, a city, a phone number, a connection speed, an access type and a price.

26. The method of claim 1 wherein the customization information includes pricing rule information specifying a pricing rule to be applied to network connection points within at least one country.

27. The method of claim 26 wherein the pricing rule specifies a markup percentage to a connection price charged by a network access provider for access in the at least one country.

28. The method of claim 26 wherein the pricing rule specifies a range price rule that utilizes a basic connection price charged by a network access provider for access in the at least one country.

29. A customization system to manage a customized network connection application, the system including:
 a customization tool to receive customization information pertaining to the customized network connection application, the customization tool to receive the customization information via a plurality of input interfaces, the customization tool to receive the customization information from a customer of the customization system, the customization tool to receive further customization information indicating a modification to the profile associated with the customized network connection application from a plurality of end-users associated with the customer;
 a database to store the customization information as a profile associated with the customized network connection application; and
 a build server to generate, utilizing the profile, the customized network connection application and to distribute the customized network connection application to the plurality of end-users associated with the customer wherein the customer is configured to provide Internet access to the end-users using the customized network connection application, the build server to generate an updated customized network application in accordance with the modification to the profile, and to distribute the updated customized network connection application to the end-users.

30. The system of claim 29, wherein the customized network connection application is to be distributed as a self-installing executable.

31. The system of claim 29 wherein the plurality of input interfaces include a plurality of markup language documents, and wherein the customization tool is further to communicate the plurality of markup language documents to a computer system accessed by the customer.

32. The system of claim 29 wherein the customization information includes pricing information indicating whether the customized network connection application displays a connection price associated with at least one network connection point accessible utilizing the customized network connection application.

33. The system of claim 32 wherein the pricing information specifies a currency in which the connection price is displayed by the customized network connection application.

34. The system of claim 33 wherein the pricing information specifies a conversion rate to be applied when the connection price is displayed in the specified currency.

35. The system of claim 32 wherein the connection price is based on a basic connection price specified in a pricing plan associated with the customer and negotiated between the customer and a network access provider.

36. The system of claim 29 wherein the customization information includes network access point information identifying a plurality of network access points to which the customized network connection application is authorized to establish a network connection.

37. The system of claim 36 wherein the network access point information includes Point of Presence (POP) information identifying at least one Point of Presence.

38. The system of claim 37 wherein the Point of Presence information includes any one of a group of information items including a country identifier, a region identifier, a city identifier, an area identifier, a telephone number, a maximum connection speed, and price information indicating a price for accessing the at least one Point of Presence.

39. The system of claim 29 wherein the build server is to generate the network connection application as authorized to use any one of a collection of network access points to establish a network connection, and wherein the customization information includes update information indicating whether the customized network connection application is automatically to update the collection of network access points.

40. The system of claim 39 wherein the collection of network access points includes a collection of Points of Presence (POPs).

41. The system of claim 29 wherein the customization information includes session limit information indicating a limited amount of time for which a network connection may be established utilizing the customized network connection application.

42. The system of claim 29 wherein the customization information includes connection mode information indicating a mode by which the customized network connection application establishes a network connection.

43. The system of claim 42 wherein the connection mode information indicates any one of a group of connection modes including a modem connection, an ISDN connection, a wireless broadband connection, and a wired broadband connection.

44. The system of claim 29 wherein the customization information includes a logo to be displayed by an interface of the customized network connection application.

45. The system of claim 29 wherein the customization information includes post-connect action information identifying at least one action to be performed subsequent to establishment of a network connection by the customized network connection application.

46. The system of claim 29 wherein the customization information includes pre-connect action information identifying at least one action to be performed prior to establishment of a network connection by the customized network connection application.

47. The system of claim 29 wherein the customization information includes error action information identifying at least one action to be performed upon occurrence of an error in an establishment of a network connection by the customized network connection application.

48. The system of claim 29 wherein the customization information includes disconnect action information identifying at least one action to be performed upon disconnect of a network connection established by the customized network connection application.

49. The system of claim 29 wherein the customization information includes phonebook information identifying at least one phonebook providing a markup on a basic connection price charged by a network access provider, and to be included in a total connection price to be charged to an end-user of the customized network connection application.

50. The system of claim 49 wherein the markup is expressed as a percentage of the basic connection price.

51. The system of claim 49 wherein the total connection price comprising a sum of the basic connection price and the markup is displayed to the end-user via an interface of the customized network connection application.

52. The system of claim 29 wherein the customization information includes network access point filter information providing criteria to filter network access points that are accessible utilizing the customized network connection application.

53. The system of claim 52 wherein the criteria include any one of a group of criteria including a country, a state, a city, a phone number, a connection speed, an access type and a price.

54. The system of claim 29 wherein the customization information includes pricing rule information specifying a pricing rule to be applied to network connection points within at least one country.

55. The system of claim 54 wherein the pricing rule specifies a markup percentage to a connection price charged by a network access provider for access in the at least one country.

56. The system of claim 54 wherein the pricing rule specifies a range price rule that utilizes a basic connection price charged by a network access provider for access in the at least one country.

57. A system to manage a customized network connection application, he system including:
   means for receiving, at a customization system, customization information pertaining to the customized network connection application, the customization information originating from a customer of the customization system and arriving via a plurality of input interfaces;
   means for storing the customization information as a profile associated with the customized network connection application;
   means for generating utilizing the profile, the customized network connection application;
   means for distributing the customized network connection application to end-users associated with the customer wherein the customer is configured to provide Internet access to the end-users using the customized network connection application; means for, subsequent to the distribution of the customized network connection application, receiving further customization information indicating a modification to the profile associated with the customized network connection application;
   means is for generating an updated customized network application in accordance with the modification to the profile; and
   means is for distributing the updated customized network connection application to the end-users.

58. A machine-readable storage medium having a sequence of instructions stored thereon that, when executed by a machine, cause the machine to perform a method to manage a customized network connection application, the method comprising:
   receiving, at a customization system, customization information pertaining to the customized network connection application, the customization information received from a customer of the customization system via the plurality of input interfaces;
   storing the customization information as a profile associated with the customized network connection application;
   generating, utilizing the profile, the customized network connection application;
   distributing the customized network connection application to end-users associated with the customer, wherein the customer is configured to provide Internet access to the end-users using the customized network connection application;
   receiving, subsequent to the distribution of the customized network connection application, further customization information indicating a modification to the profile associated with the customized network connection application;
   generating an updated customized network application in accordance with the modification to the profile; and
   distributing the updated customized network connection application to the end-users.

* * * * *